INVENTOR.
ANTHONY C. PALATINUS
BY Ernest J. Weinberger
Max A. Darmer
ATTORNEYS

INVENTOR.
ANTHONY C. PALATINUS
BY Ernest J Weinberger
Max L Farmer
ATTORNEYS

INVENTOR.
ANTHONY C. PALATINUS
BY Ernest J Weinberger
Max [signature]
ATTORNEYS

INVENTOR.
ANTHONY C. PALATINUS
BY Ernest J. Weinberger
Max A. [signature]
ATTORNEYS INVENTOR.
ANTHONY C. PALATINUS
BY Ernest F. Weinberger
Max J. Garner
ATTORNEYS INTERMODULATION TEST SYSTEM WHOSE FREQUENCY IS GOVERNED BY AN R.F. TWO TONE SIGNAL Filed April 3, 1964 8 Sheets-Sheet 6

SYMBOLIC REPRESENTATION OF SIGNAL PROCESSING

INVENTOR.
ANTHONY C. PALATINUS

BY Ernest J. Weinberger
Max L. Harmon
ATTORNEYS

Feb. 13, 1968 A. C. PALATINUS 3,369,176

INTERMODULATION TEST SYSTEM WHOSE FREQUENCY IS GOVERNED BY AN R.F. TWO TONE SIGNAL

Filed April 8, 1964 8 Sheets-Sheet 7

INVENTOR.
ANTHONY C. PALATINUS
BY Ernest F. Weinberger
Max R. Farmer
ATTORNEYS

INVENTOR.
ANTHONY C. PALATINUS
BY Ernest J. Weinberger
Max A. [illegible]
ATTORNEYS 3,369,176
INTERMODULATION TEST SYSTEM WHOSE FREQUENCY IS GOVERNED BY AN R.F. TWO TONE SIGNAL

Anthony C. Palatinus, 68—17 60th Road, Maspeth, N.Y. 11378

Filed Apr. 8, 1964, Ser. No. 358,383
6 Claims. (Cl. 324—57)

ABSTRACT OF THE DISCLOSURE

An RF linearity test system which employs for the output analysis an RF frequency determining and audio tunable control of an actuated selective filter. An RF two tone test signal source further generates and separately supplies an RF carrier signal of a mean frequency value that governs a first poly-modulation quadrature operation and an audio carrier signal of selectable frequency value equal to, or an odd multiple of, one-half the frequency difference between the main tones and also provides the audio tuning of the second poly-modulation quadrature process. This action sequentially selects the main tone, third and fifth odd order difference frequency intermodulation components in the test response output spectrum in three steps. The subsequent voltage indications of the filtered output indicates the linearity characteristics of the unit under test.

Figure 1:
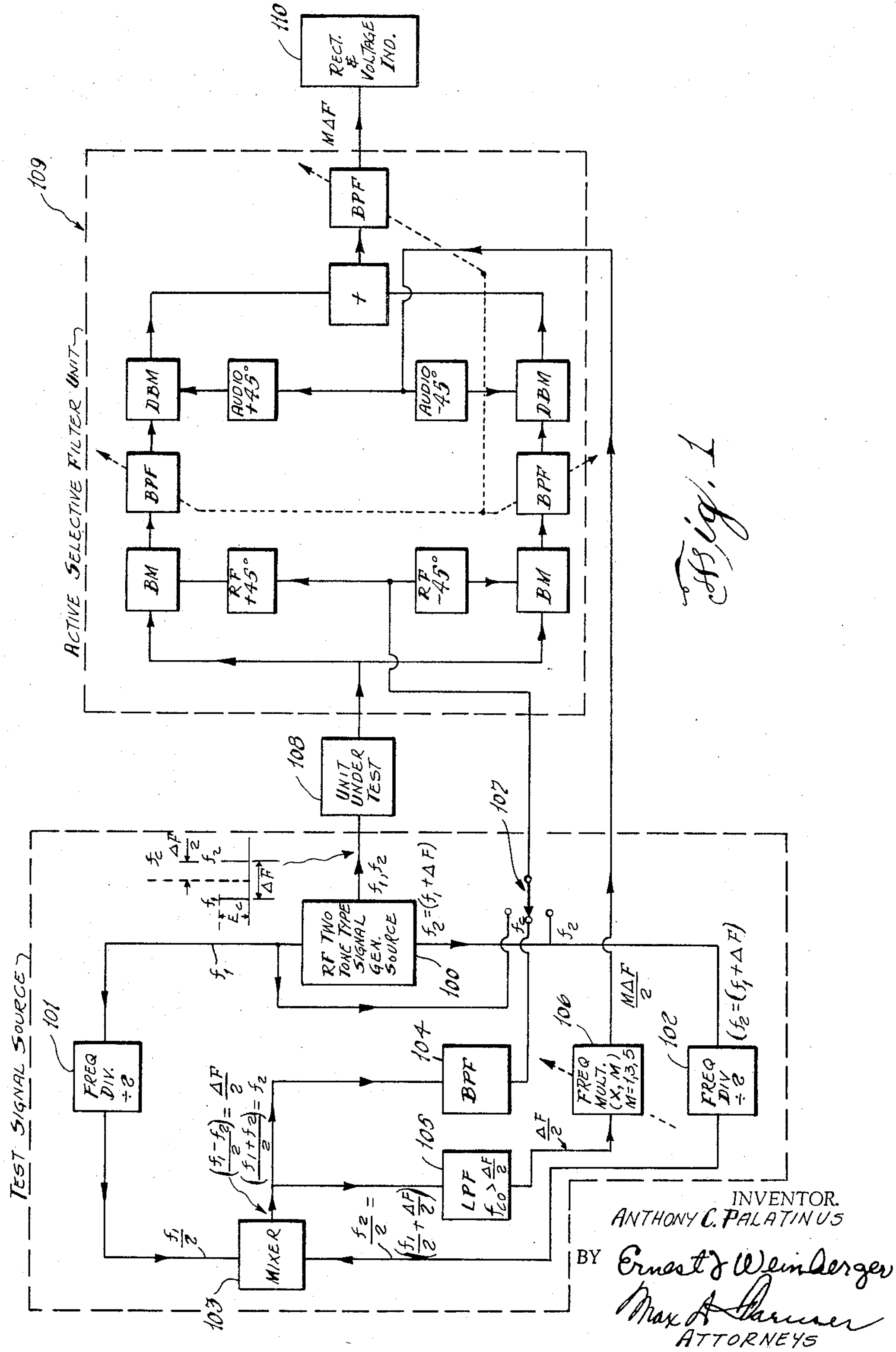

The invention described herein may be manufactured and used by or for the Government of the United States of America for governmental purposes without the payment of any royalties thereon or therefor.

The present invention relates generally to the measurement and evaluation of the linearity of the transfer function of various electrical devices and to the analysis and indication of such distortion characteristics. In particular it refers to the determination of the intermodulation distortion component content of the spectrum output inherent in the response of an active quasi-linear device such as an amplifier or in the response of a passive network due to the employment of a static two tone RF signal as the test input.

Presently available equipment for the above applications which employ static two tone RF test signals in the measurement of distortion at high RF frequencies of devices possessing narrow bandwidths are deficient in their lack of stability and sensitivity with a resultant excessive expenditure of time. Further this equipment as available is extremely complex and the analysis system required therewith also possesses and introduces certain limitations. Convention and prior art indicate to some extent the use of a static two tone signal in conjunction with narrow band spectrum analyzers for the measurement of odd order intermodulation distortion. Inherent in such analyzers is the development of "ringing" distortion wherever the frequency scanned spectrum is sampled at a rate allowing insufficient time for buildup of the resolving network to respond to the frequency swept energy. An additional problem also exists in that it is extremely difficult, with spectrum analyzers, to separate and resolve adjacent sideband components where the existing amplitude relationship between two adjacent signals is large, as for example, in excess of 60 db. In attempting to solve the above problem the use of conventional selective voltmeters and wave analyzers or other tunable measuring means such as narrow band receivers have been suggested for point by point measurements. These devices, however, are not of sufficient frequency stability and separation capability for present and future standards as those established on continental Europe where 400 cps. frequency separation is used, and in England where the two tone spacing is 675 cps. at high frequencies. Such is also the case for independent multichannel sideband communication systems (ISB) where determination of the intermodulation content within and between specific channel bandwidths is necessary.

It may be stated generally, that the static two tone test signal method has been recognized as a standard test input in the measurement of intermodulation distortions. The provision of a distortionless frequency pair and with each tone of equal amplitude is most aptly accomplished through the use of separate stable tone oscillators which are isolated from one another by buffer amplifiers and their equal outputs being additively combined. The two separate tones flow distinct paths until they are linearly summed to form the well known two tone waveform. This classical manner of two tone generation usually demands frequency controlled oscillators, particularly in the RF regions. Since these tones are required in various frequency bands variable frequency multiplication is applied to each singular tone with attendant multiplication of the frequency drift in the oscillators. Where selection between the amount of tone separation is desirable, and particularly so when equal separation intervals are necessary at various spectrum locations in a number of bands, the multiplication of the existing frequency error and drift limits the speed, range and accuracy of this type test signal. When used with present art output measuring equipment as combined in conventional intermodulation distortion test systems, both the test signal limitations and the deficiences of the output measuring means compound to further deter the speed, range and accuracy of the measurements. It is accordingly an object of this invention to provide a measurement techinique that effectively integrates the two tone test signal characteristics with the response output measuring characteristics and insures the desired output intermodulation distortion measuring capabilities with improved speed, wider range of operation, and greater accuracy.

It is also an object of this invention to provide a signal generator for the development of the proper two tone test signals and their required associated characteristic operating signals over a multiple frequency spectrum.

A further object is to provide an apparatus and method for economically and rapidly determining with repeatable ease, stability, accuracy, sensitivity and without the conventional frequency separation limitations, the intermodulation distortions of a particular device at various frequency locations.

Another object is to provide activated variable bandstop and bandpass selective filters over a wide frequency region, with flat, narrow bandwidths and sharp steep skirts, that is independent of frequency drift.

Other objects and advantages will appear clear from the following description of examples of the invention, and the novel features will be particularly pointed out in the appended claims.

In the accompanying drawings:

FIG. 1 is an overall block diagram representation of an elementary embodiment of the intermodulation test system made in accordance with the principle of this invention.

Figure 2A:
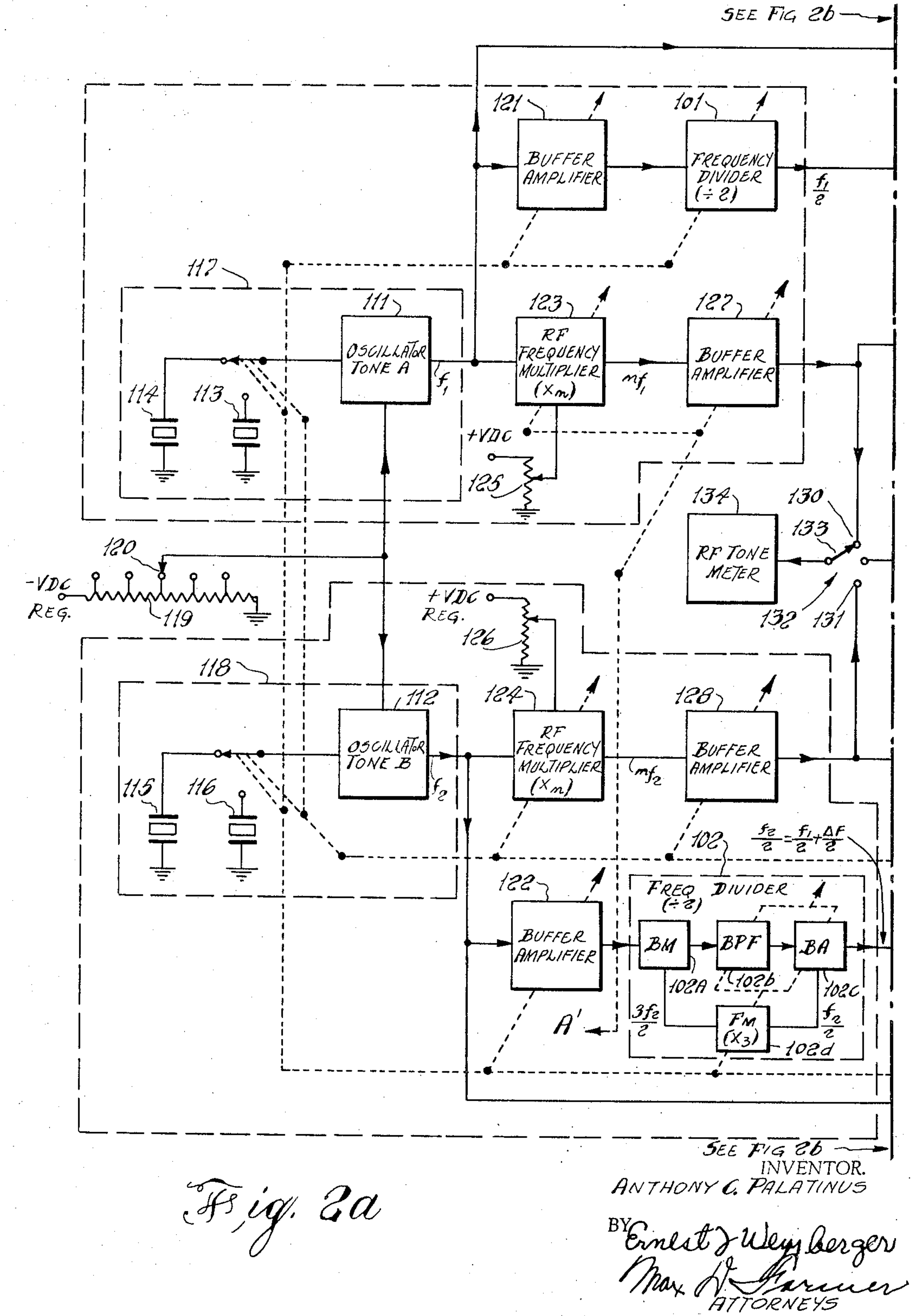

FIGS. 2*a*, *b* are detailed block diagrams illustrating a signal generating embodiment of the intermodulation test system made in accordance with the invention.

Figure 3A:
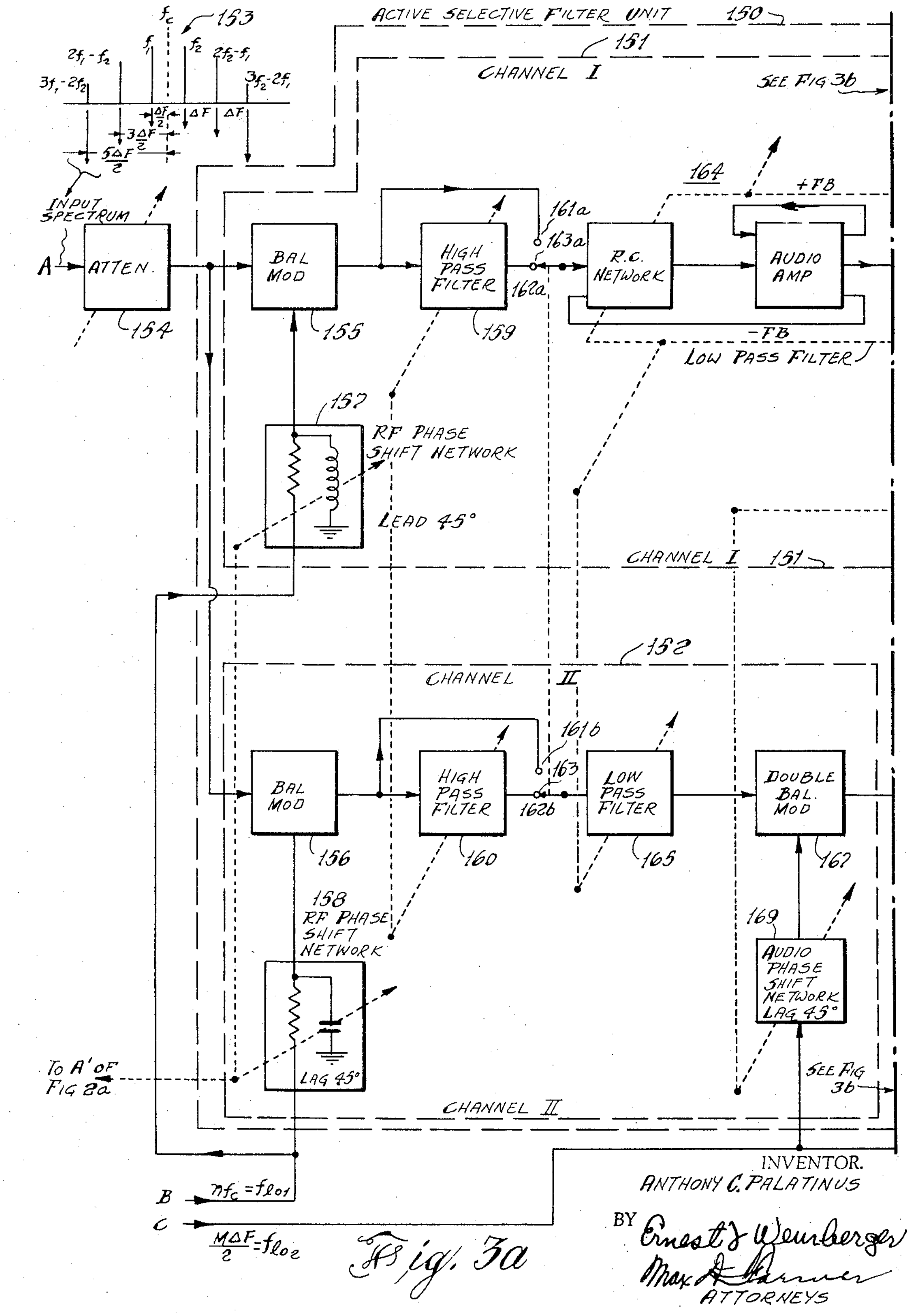

FIGS. 3*a*, b are detailed block diagrams illustrating an output measuring embodiment of the intermodulation test system made in accordance with the invention.

Figure 2B:
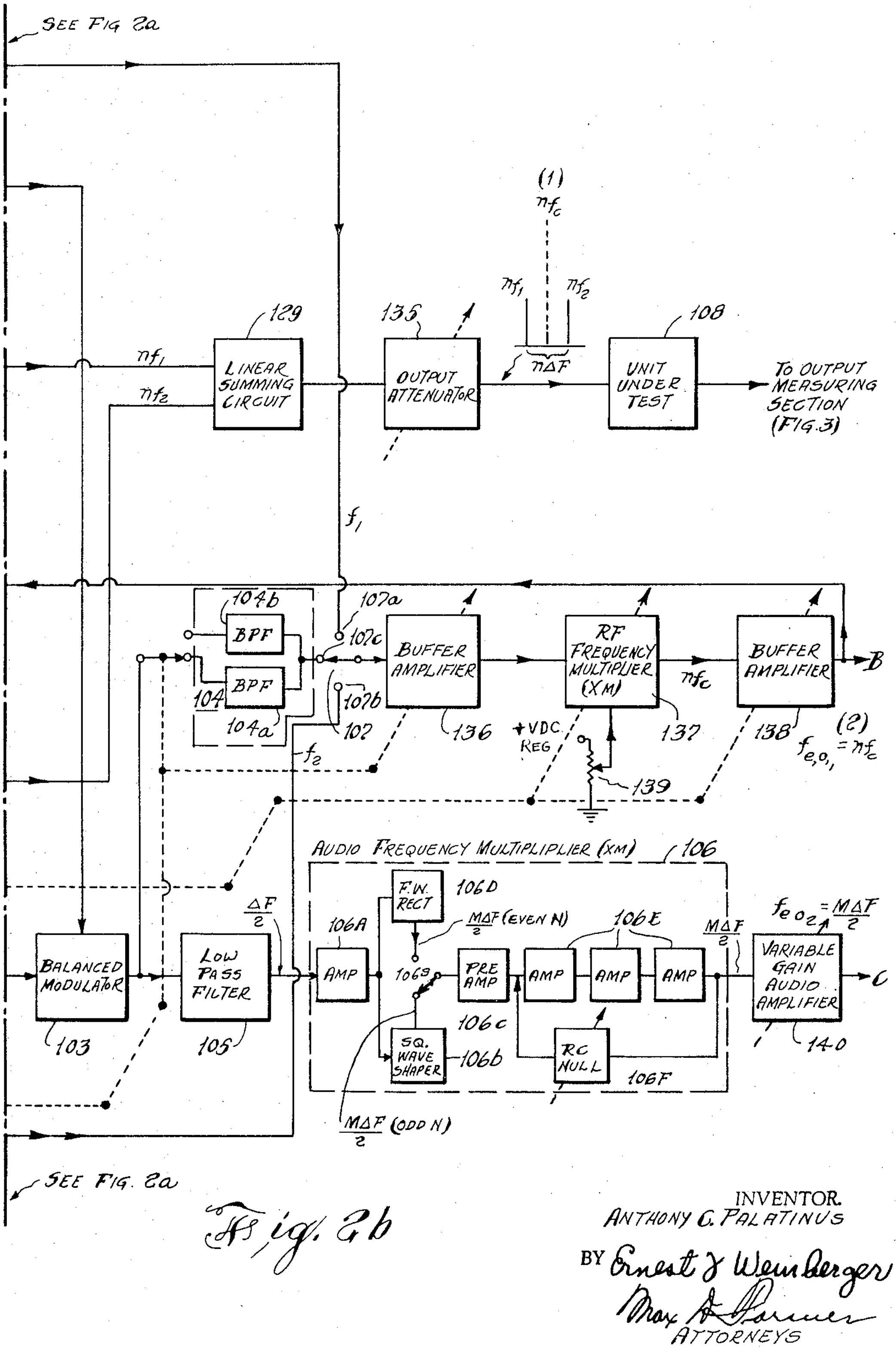
Figure 3B:
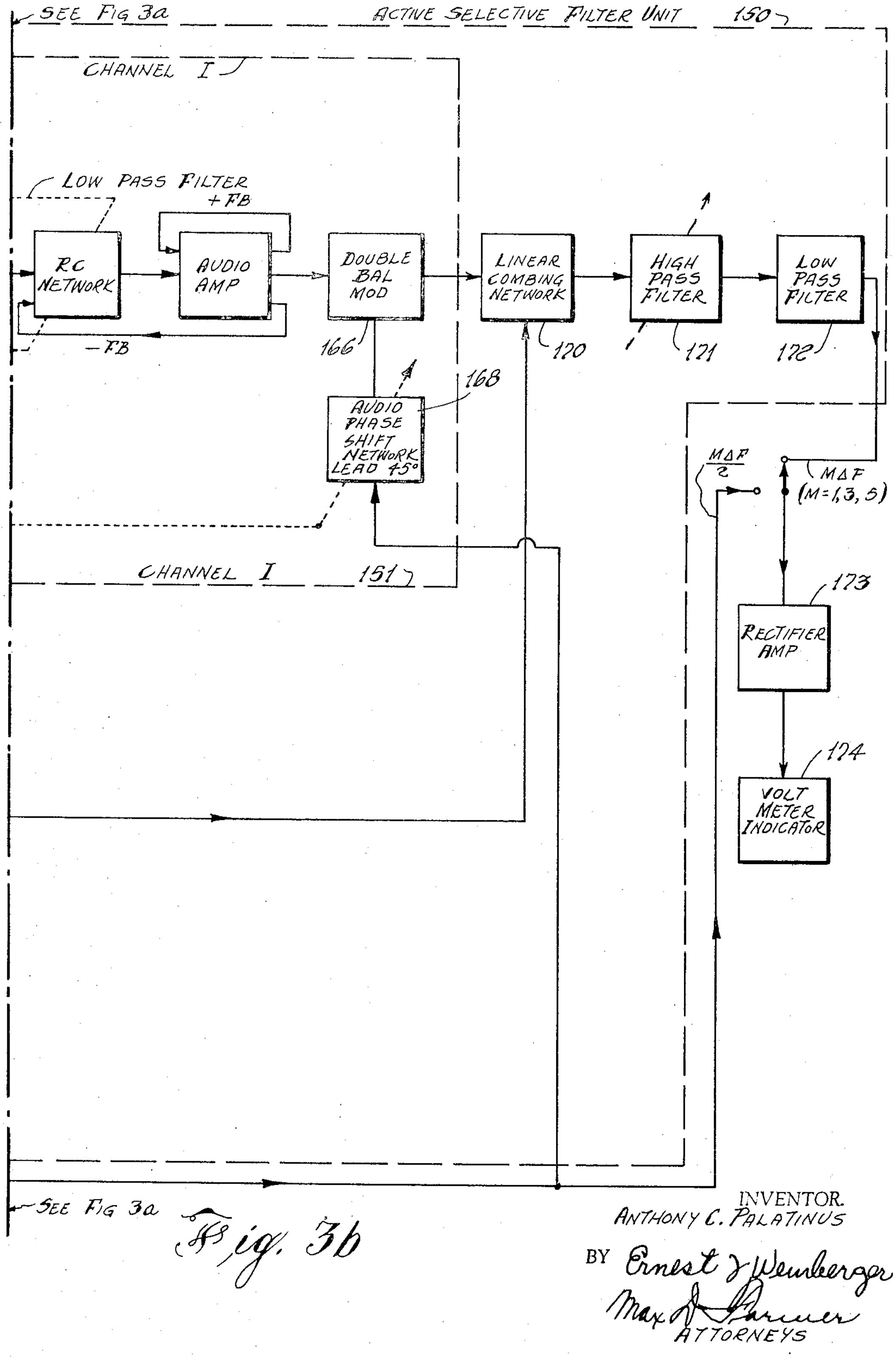
Figure 4A:
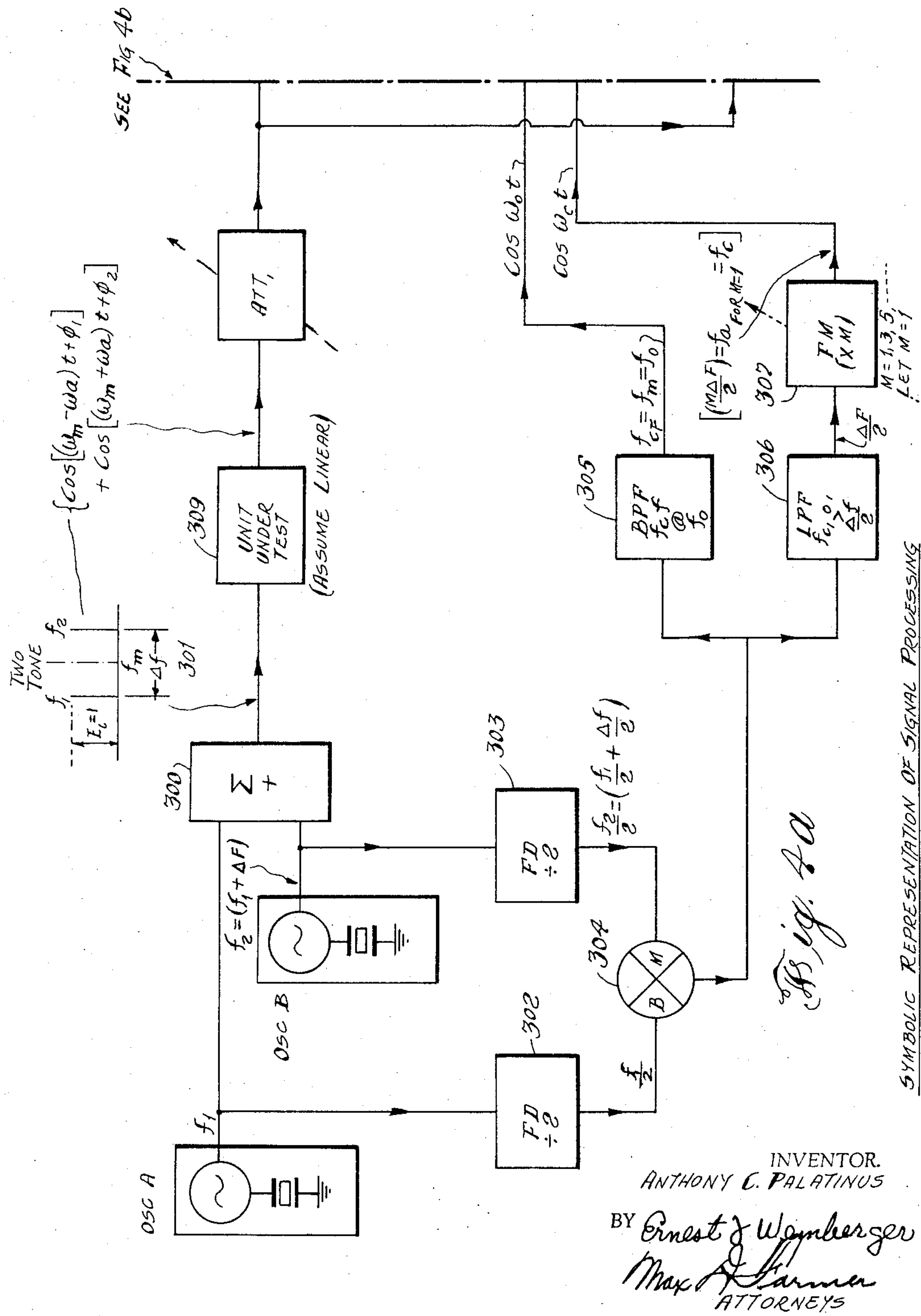

FIGS. 4*a*, *b*, are an elementary symbolic system representation of the overall operation of the embodiments of FIGS. 2 and 3 in accordance with the principle of this invention.

Figure 5:
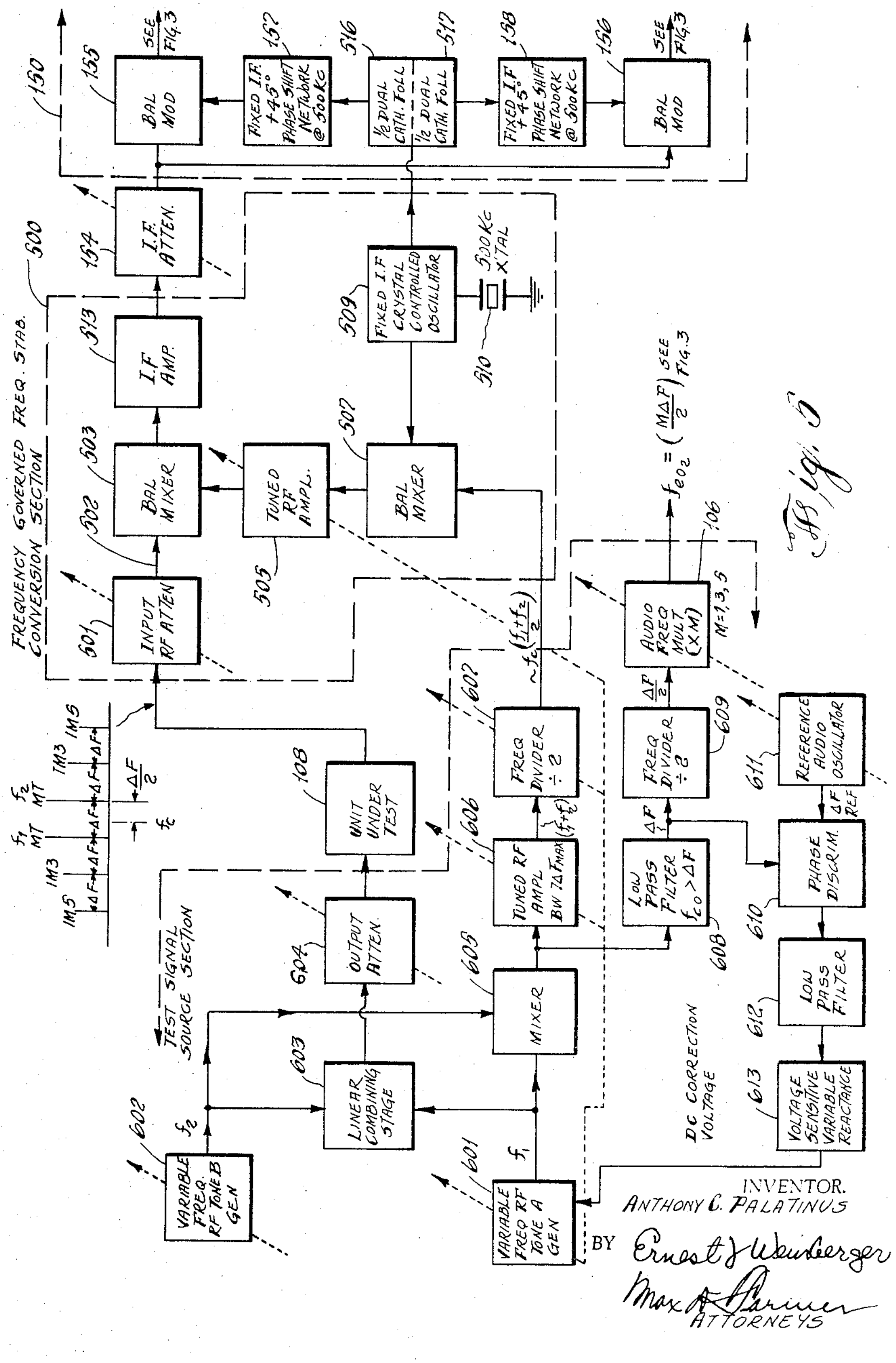

FIG. 5 is a block diagram arrangement illustrating a continuously variable frequency signal generating embodiment with a stable frequency converting embodiment of the intermodulation test system made in accordance with the invention.

In the block diagram, FIG. 1, of an embodiment of the elements of this invention, RF two tone signal generator source 100 supplies combined output frequency signal designated as $f_1$, and $f_2$ displaced in frequency from $f_1$, by a ΔF cps. interval. Two tone generators are well known and readily supply two equal amplitude RF test frequencies separated from each other by an audio frequency amount of ΔF cps. The source 100, however, has three separate outputs, namely the two individual RF frequencies and the combined frequencies. The individual frequency outputs are fed into frequency dividers 101 and 102 which divide the input frequencies by a factor of two. The divider outputs are then applied to mixer 103 whose output thereby comprises the difference frequency or $$\frac{\Delta F}{2}$$

and the sum frequency or $$\frac{(f_1+f_2)}{2}$$

which is in the center or mean frequency $f_c$. The mixer 103 output is fed into a pair of parallel paths one having therein a bandpass filter 104 which only passes the center frequency $f_c$ while the other path contains a low pass filter 105 which passes the $$\frac{\Delta F}{2}$$

frequency to variable audio frequency multiplier 106 which in turn produces an output which is a selected odd multiple M of $$\frac{\Delta F}{2}$$

The individual outputs of generator 100 and that of filter 104 are fed to the fixed contacts of single-pole-triple throw-switch 107.

The two tone combined output of generator 100 is applied as the RF test signal to the input of the device 108 under test as shown in the spectrum sketch. The device's RF response output, which includes the intermodulation distortion content introduced due to device 108's nonlinearities, is thereby measured on a comparative response component basis by the activated output measuring apparatus of the test system. The two tone response output under analysis is applied to the input of the activated selective filter unit 109 which will be subsequently described in detail with reference to FIG. 3. The related generated signals supplied as operating inputs that result in the proper activation and variable tuning of the selective filtering process within active filter unit 109, comprise the center frequency RF signal $f_c$ obtained from the output of bandpass filter 104 and a selected audio frequency signal that is an odd multiple of $$\frac{\Delta F}{2}$$

or $$\frac{\Delta F}{2}$$

itself, derived from multiplier 106 output. The resultant audio signal output of the active selective filter unit 109 is of frequency value that is twice the frequency of the signal applied from the multiplier 106, that is, equal to $M\Delta F$, where M as selected may be 1, 3, 5, etc. The amplitude of the output signal of $M\Delta F$ is directly related to the amount or degree of distortion, whereby with $M=1$, the amplitude is proportional to the fundamental or main RF tone $f_2$ or $f_1$) amplitude of the response output, proportional to the 3rd (upper or lower) odd order difference frequency intermodulation component of the response output for $M=3$, and proportional to the 5th IM term with $M=5$. Rectification of audio signal output $M\Delta F$ and measurement of its amplitude is made and indicated by rectifier and voltage indicator 110.

FIG. 2 illustrates in more particular detail a preferred embodiment of the signal generating elements of the invention shown in FIG. 1 as two tone generator 100, dividers 101 and 102, mixer 103. filters 104 and 105, and multiplier 106. In FIG. 2, a pair of RF oscillator circuits 111 and 112 for tone A and tone B respectively, having pairs of quartz crystal units 113, 114 and 115, 116 with each unit being of selected different nominal frequency value, result in stable oscillators 17 and 118 which are controlled and stabilized in frequency thereby as is the common current practice. Here the crystal oscillators 117 and 118 may be of the voltage controlled variable frequency type, either transistor or vacuum tube, where the operating frequencies of the oscillators can be "pulled" to vary over a narrow frequency range about the quiescent frequencies of the oscillators, which are the crystal unit frequency values. Either crystal pair is selected by a ganged switch arrangement which also varies other tuned circuit parameters as required for the newly generated frequencies. Commercial equivalents readily available to supply the stone signals separately as an example are two master oscillator power amplifier type generators such as Hewlett-Packard Model 606A signal generator or two crystal frequency synthesizers such as Manson Laboratories Model 410.

In general where crystals are employed it is desirable that they exhibit superior high frequency operation such as AT cut quartz crystal units in HC–6/U holders. Clearly as the frequencies of the oscillators differ by some small nominal amount in that the corresponding crystal pairs are set to differ by some fixed frequency, then as multiplication is employed a number of selectable dual tones are available at multi-frequency locations. As an example, but not limited thereto, one may select a combination for convenience wherein crystal 114 oscillates at 2.000 mc. while 115 oscillates at 2.001 mc. thus providing an audio difference of 1,000 c.p.s. Similarly 113 operates at 3.500 mc. and 116 at 3.501 mc. By multiplying both up by the same variable factor, an adequate distribution of tone pairs will exist in the high frequency region of 2 to 30 mc. Where as in the illustrated embodiment some controlled variation in frequency separation of the crystal stabilized frequencies is preferably desired, voltage controlled variable capacitance elements, such as voltage sensitive variable capacitor diodes, are incorporated with the crystal units as is common practice. Accordingly a negative fixed DC voltage supplied from a stabilized regulated source (not shown) is applied across a step potentiometer 119 which in turn has its movable tap arm 120 connected into both crystal circuits to thereby apply selected DC voltage increments across voltage controlled capacitors of oscillators 117 and 118. The arm 120 may be continuously variable or the potentiometer provided with fixed taps such as preferred voltage divider shown so as to allow suitable variation range in the discrete selection of a number of intervals of audio frequency separation between the two RF tones generated.

The contact arm 120 of potentiometer 119 when in its center position as shown represents the setting for the quiescent frequency separation which for example might be 1,000 cps. Accordingly as greater negative DC bias voltages are applied to the voltage sensitive diode capacitors of the oscillators the amount of frequency separation between the tones increases. Contra as the DC bias becomes less negative the frequency separation decreases. In order to produce this frequency separation variation as required and specified for the embodiment shown, the diode capacitor of one oscillator is connected with a reverse polarity as to the other like diode capacitor. Under this arrangement a frequency increase in one oscillator is accompanied by an exact corresponding frequency decrease in the other and thus the quiescent center frequency remains as the mean frequency value of the two frequencies generated no matter what degree of separation is produced. It should be noted that the herein invention can tolerate a certain degree of non-symmetry about the quiescent condition since an exact center frequency signal as described subsequently, is derived directly from the two tones being produced. Typical commercially available oscillator units suitable for use herein are the Itek Corp's Mode 10M–MAVCXO or Model 5114 WAVCXO by Damon Engineering of Mass. A satisfactory range of separation has been found to be approximately 0.1% of the mean frequency value for the operations range of 2 to 10 mcs. while above the range the maximum spacing would not exceed 5 kcps.

Since the outputs of both oscillators 117 and 118 are separately fed into similar circuits, which are ganged together, it is only necessary to describe one. An output frequency designated as $f_1$ and $f_2$, is simultaneously applied to buffer amplifier 121 (122), RF frequency multiplier 123 (124) and to contacts 107A (107B) of single poletriple throw switch 107. The frequency multipliers are tuned RF amplifiers set to be selectively variable for multiplication factor $X_n$ where $n=1, 2, 3, 4$, etc. A typical multiplication process, although other suitable methods are available, would be the cascade arrangement of three stages of frequency doublers for factors Z, 4, 8, an additional doubler and tripler for factor of 6, with selected tuned circuit switching. Properly tuned pairs of output tank circuits would be associated with each multiplier section and connected in circuit dependent on which set of crystals were being employed. Since it is essential that the outputs of multipliers 123 (124) be independently adjustable to set equal amplitudes, each has been provided with variable potentiometer 125 (126) which adjustably feeds, a positive potential from a regulated DC source (not shown), to each multiplier. With this positive potential applied to the screen grid element of the multiplier tube, it serves to control the output voltage amplitude of the multiplier. The outputs are individually adjusted to a desired and equal level by comparison with a meter indication for a single tone measurement as to be explained hereinafter.

The outputs of multipliers 123 (124) are fed into buffer amplifiers 127 (128) which are mechanically ganged with the tuning of the multipliers. In turn the outputs of these buffer amplifiers are simultaneously applied to a linear summing circuit 129 and to two of the stationary contacts 130 (131) of single poletriple throw switch 132 whose movable arm 133 is connected to an RF tone meter 134. The tone meter is essentially a diode rectifier and has a pre-calibrated scale so that by means of switch 132 each signal may be evaluated and then adjusted for the proper and equal amplitude indication.

The linear summing circuit 129, accepting both signals $nf_1$, and $nf_2$ linearly adds them. This circuit, which may be either of the capacitive or resistive form, is conventional in the art and additionally provides isolation between the separate tone paths. By way of example, a satisfactory RF summing or combining network would comprise a pair of series connected capacitors with one signal frequency applied at one end and the other signal frequency at the opposite end. By selecting the capacitive values of each individual capacitor to give approximately the same relative capacitive impedance independent of the particular values of the two signal frequencies, a linearly combined frequency output is thereby derived at the common junction of the two capacitors and is applied to variable output attenuator 135. This attenuator 135 serves to permit variation in the two tone signal output level just prior to its application in the testing of unit or device 108.

Up to this point a two tone signal has been generated, whose typical spectrum representation is as shown sketched, and applied to the unit under test 108. It now remains to describe, in addition to the active filter 109, and the generation of the operating and tuning signals applied thereto. It should be noted that although the two tones are frequency variable, FIG. 2 in conjunction with FIG. 3 indicate ganged coupling between various circuits so as to allow the tuning and measurement operation of the entire apparatus to be varied dependent on the crystal or tone signal frequencies being selected and applied.

Returning now to the separate outputs of oscillators 117 and 118, which have been described as being applied to the inputs of tuned buffer amplifier 121 and 122. As noted, tone A crystal oscillator 117 generates frequency $f_1$ and oscillator 118 for tone B supplies frequency $f_2$. The outputs of the buffer amplifier 121, 122 are fed to frequency dividers 101, 102 respectively. The dividers function to provide frequency division by a factor of two such that the signal frequency output of divider 101 is one half the lower main tone frequency or $$\left(\frac{f_1}{2}\right)$$

and divider 102 supplies a signal frequency output of one half the upper main tone frequency or $$\left(\frac{f_2}{2}\right)$$

Although frequency division by two may be conventionally accomplished in a number of ways, a particular example illustrated (see divider 102) is a regenerative frequency divider. The conventional divider comprises a balanced modulator stage 102A which accepts the buffer amplifier input at $f_2$, a band pass filter 102B following the modulator and whose bandpass center frequency is tuned to one-half the input frequency. The output of the filter is applied to buffer amplifier 102*c* also tuned to one-half the input, whose output in turn feeds the balanced modulator 103. A portion of amplifier 102*c* output is regeneratively fed-back to modulator stage 102A via frequency tripler 102D. With this closed loop arrangement the balanced modulator 102A output is a double sideband with sum terms $$\left(f_2+\frac{3f_2}{2}\right)$$

and difference term $$\left(\frac{3f_2-f_2}{2}=\frac{f_2}{2}\right)$$

and in which the difference term is passed by filter 102B to provide an output at one-half input frequency. In order to provide frequency coherence, the tuning of buffer amplifiers 121, 122 and the dividers 101, 102 are coupled, as illustrated with the spdt switches of oscillators 117, 118 that are controlling the crystal selections.

The output of the frequency dividers 101 and 102 are simultaneously applied to the balanced modulator 103 which in turn provides therefrom the sum and the sum and difference frequencies $$\left[\frac{(f_1+f_2)}{2}=f_c\right]$$

and $$\left[\frac{f_1-f_2}{2}=\frac{\Delta F}{2}\right]$$

in its output.

The balanced modulator 103 may, by way of example, be of the common ring diode bridge circuit arrangement presently extensively used in the art.

Bandpass filter 104 which receives a portion of the modulator output can comprise as illustrated a pair of separate bandpass filters 104A and 104B which may be switched in accordance with and ganged to the crystal unit selector switches. The bandpass region is selected in relation to the quiescent mean frequency value between the oscillator 117, 118 frequencies. As an example, if one set of crystals result in oscillator outputs at 2.000 mc. and 2.001 mc. then the center frequency is 2.0005 mc. and one of the bandpass filters, say filter 104A, would be characterized by a flat narrow bandpass of a crystal lattice structure that accordingly allows for sufficiently wide deviation of this center frequency signal within its bandwidth. The filter 104 therefore effectively passes only the actual center frequency value ($f_c$). Another portion of the modulator 103's output is applied to the low pass filter 105 which pass there through only the difference term namely $$\frac{\Delta F}{2}$$

An alternative method for deriving this difference frequency for a range of frequencies up to 100 kc. would be to apply $$\frac{f_1}{2}$$

and $$\frac{f_2}{2}$$

as inputs to a signal actuated electronic device such as a Model 801. Differential Frequency Module manufactured by Solid State Electronics Corp., California. This differential frequency unit, when operated with a low pass filter at its output, produces a continuous output frequency which is the absolute difference between two continuous input frequencies.

The output $f_c$ of the bandpass filter 104 is connected to contact 107*c* of switch 107 and when the switch pole is in contact therewith the signal is passed through buffer amplifier 136 to RF frequency multiplier 137. This multiplier 137 is constructed similar to RF tone multipliers 123, 124 and is ganged to multipliers 123 and 124 so as to provide the identical variable multiplication factor "N" whereby its output is ($nf_c$). The multiplier 137 output is fed into tuned buffer amplifier 138 whose output in turn is applied as the common RF local oscillator signal for the first RF modulator pairs of the active selective filter unit 109 shown in FIG. 3. With the pole of switch 107 contacting terminal 107*c* the supplied local oscillator frequency is $nf_c$. The tuned bandpass regions of amplifier 138 and multiplier 137 are in the RF range and made relatively flat over a bandwidth sufficient to encompass tones $nf_1$, and $nf_2$ with introducing any undue attenuation. Since at the other terminals of switch 107 there exist the two tones ($f_1f_2$), this switch provides a selection of local oscillator frequencies $nf_c$, $nf_1$, and $nf_2$ at the amplifier 138 output. The amplitude of this output may be adjusted by potentiometer 139 of the multiplier 137 in similar manner as for multipliers 123, 124. This amplitude is compared or read via switch 132 by the tone meter 134 and adjusted to some precalibrated scale marking on the meter such that it is of the proper level for the output measuring section. The other common local oscillator frequency $$\frac{M\Delta F}{2}$$

is derived from the audio frequency term applied to the low pass filter 105 whose cut-off frequency value is made greater than $$\frac{\Delta F}{2}$$

max. This output of the filter 105 is fed into an audio frequency multiplier 106 whose multiplication factor "M" is selectable and therefore its output signal to the measuring unit is at some frequency $$\frac{M\Delta F}{2}$$

The general form of "M" can be selected so that it is made in association with RF multiplication factor N of the tone multipliers such that the proper audio frequency signal terms are generated.

By way of example audio multiplier 106 in its most general form consists of an initial audio amplifier 106A whose sine wave output is clipped to obtain an approximate square wave, via shaper 106B, output which is then applied by way of SPDT switch 106S to stage 106C thereby containing $$\frac{\Delta F}{2}$$

and all the useful odd harmonics of $$\frac{\Delta F}{2}$$

from which the fundamental ($M=1$), and odd M factors of 3 and 5, can be selected for odd "N" RF multiplication factor settings. For the case of even "N" RF multiplier factors, the output of audio amplifier 106A is also applied to a full wave rectifier 106D whose output contains the even harmonics of $$\frac{\Delta F}{2}$$

and by way of switch 106S may also be connected to preamplifier 106C. The fact that separate sources for odd and even $$\frac{(\Delta F)}{2}$$

harmonics are employed allows for a wider frequency separation for the subsequent tuned selection of a harmonic thus precluding those problems arising from a system having closely spaced harmonic frequencies. The output of the pre-amplifier 106C passes through three stages of audio amplifiers 106E and is fed back thereabout through a passive frequency selective network 106F which applies negative feedback for all frequencies except the desired one at which network 106F, usually a variable RC bridge arrangement, is sharply tuned. Since the selection of the particular "M" factor is determined in accordance with the order IM term, or the fundamental component, of the RF test response output to be measured, the frequency tuning of multiplier 106 is made independent of other tuning arrangements. A calibrated frequency scale coupled with the tunable RC network 106F indicates the frequency value selected. The output of multiplier 106 is applied to variable gain amplifier 140 which has a flat frequency response characteristic extending beyond maximum $$\frac{(M\Delta F)}{2}$$

value developed by the generating system. The setting of the audio local oscillator voltage level to active selective filter unit 109 is determined by switching this signal to the voltmeter means 173, 174 of the output measuring section and adjusting amplifier 140 gain to obtain a precalibrated meter reading. Also this voltage monitoring of multiplier 106's amplified output in the course of its tuning leads to the rapid location and generation of the fundamental $$\frac{N\Delta F}{2}$$

frequency, and the subsequent odd M harmonic factors desired thereof.

Examination of FIG. 2 indicates that this portion of the system circuitry generates three different output signals, namely the RF two tone test output to the unit under test 108, the RF signal output ($nf_c$) of amplifier 138 and the audio signal output $$\frac{(MN-AF)}{2}$$

of amplifier 140. It is of note that the RF output levels are precalibrated through use of RF meter 134 with the audio output level being set via the output measuring meter means. While two tone generators by themselves are well known in the art, only when such generators are associated with the like of the additional circuitry illustrated in the accompanying drawings and applied as so described for the test system invention can they meet all the generation requirements necessary to extract the further signal generation herein designated as representative of the nature of the test signal response. As an example, the solid state RF two tone generator AN/URM-144, used by the military may be accordingly further extended in its application by the added inclusion of the coacting stages shown in FIG. 2 that are separate from the two tone signal combining path and thereupon suitably employed. It is clear that the overall method of the invention is not intended to be limited to any particular manner of two tone generation, nor is it intended to be frequency limited.

Reiterating, the signal source of FIG. 2 generates and supplies:

(1) A conventional two tone type test signal of minimum distortion and maximum stability, with the tones being producible at a number of selected tone pair combination, variable both in band coverage and spaced separation intervals.

(2) A local oscillator signal of frequency value equal to the mean frequency of the two tone test signal of (1) above, and (3) A local oscillator signal of a frequency equal to audio frequency spacing interval of one of the maintone pairs generated from the mean frequency of (2) above, or selectable odd multiples thereof which represent the audio frequency separation from mean frequency of (2) of the odd order (i.e. 3rd, 5th) difference frequency intermodulation components produced by the unit under test responding to the two tone signal of (1) above at the mean frequency of (2) above. The other signals, i.e. ($Nf_1$ and $nf_2$) are functionally used for system self-check purposes.

Overall, it should be realized that the derivation of the output signals $nf_c$ and $$\frac{MN-AF}{2}$$

could also be obtained by first mixing the tone frequencies $f_1$, and $f_2$ and then frequency dividing by two both the resulting sum and difference after passing them through their respective band pass and low pass filters. The two simultaneous RF signals may be at frequencies which can be in the HF region or by suitable design cover the VHF band (30–300 mc.) with a number of tone pairs. When one also considers the frequency spacing and amplitude adjustments it is clear that tone separations as low as 100 c.p.s. over a wide dynamic range are obtainable even at the upper frequencies. As is well known, present state of the art output measuring equipments are, in general, limitations on the intermodulation distortion measurement of the response output of the unit under test to such test signals since the required signal resolution would have to be obtained at extremely low audio frequencies requiring highly stable multiple heterodyning means for down the frequency translation and so coverage of a rather extended frequency range is readily difficult to achieve.

As a preferred and novel method for the direct solution of such measurement problems, the response measurement apparatus of the disclosed intermodulation test system results from the judicious implementation of the previously described test signal generator outputs as operating and tuning signals in the activation of the unique selective filter arrangement shown in FIG. 3 and functioning in accordance with the following description.

Details of the output measuring circuitry as illustrated in FIG. 3 mainly concerns an active selective filter unit 150 having a pair of channels 151 and 152, combining stage 170, band pass filter combination 171, 172, and voltmeter 173, 174. The test signal after passing through the unit under test 108 and containing, where intermodulation distortion is sufficient, those frequencies as shown by well known spectrum sketch 153, is applied to variable attenuator 154. This input attenuator functions as a dynamic range attenuator thus enabling the measurement of low level or weak signal components in the presence of large amplitude frequency component terms. It further serves to reduce the input level below that which would overload the stages that follow. The attenuated output is simultaneously applied to the inputs of the balanced modulators 155 and 156 of channels 151 and 152 respectively. The generated first local oscillator signal ($nf_c=f_{eo1}$) is applied to each of the balanced modulators 155, 156 via their respective RF phase shift networks 157 and 158. In order to simplify the subsequent description it will be assumed that no tone frequency multiplication had previously occurred and that $N=1$ so that generated signal applied is $f_c$. The phase shifter 157 of channel 151 (or I) applies a 45° lead, while the phase shifter 158 of channel 152 (or II) applies a 45° lag. The carrier inputs to both modulators are of identical suitable levels, set to be much greater than the level of the input test response signals to the modulators such that the modulator outputs are thereby linearly proportional to the amplitudes of the response signal inputs. However, the phase relationship between the carrier inputs results in being 90° out of phase with one another or in quadrature.

The outputs of pair of like RF modulators 155, 156, having quadratic carrier inputs applied whose frequency positions it at the incoming test spectrum's center or midfrequency location, result in double sideband modulator outputs. The resulting lower sideband output consists of the difference frequency products which represent the original incoming signal information down translated into the audio region and now centered about the zero (DC) frequency. The resulting upper sideband output consists of the sum frequency products which represent the incoming signal information translated and centered about twice the carrier (or the mean) frequency value. For the RF spectrum input, the modulator output upper sideband components are beyond the bandpass region of the channels and are thereby readily attenuated, leaving only the audio difference terms.

To clearly understand the relationship of the lower sideband modulator output to the incoming test spectrum response under analysis, observe further the typical RF two tone intermodulation spectrum 153 shown sketched. This spectrum response normally consists of the pair of fundamental tones, and pairs (upper and lower) of their 3rd $[(2f_2-f_1), (2f_1-f_2)]$ and of their 5th $[(3f_2-2f_1), (3f_1-2f_2)]$ odd order difference frequency terms. These signal components equally space themselves at ΔF cps. intervals in the distribution. Accordingly, with respect to the mean or mid-frequency location of the spectrum distribution, the frequency components are respectively positioned at intervals $$\left(\pm\frac{\Delta F}{2}\right), \left(\pm\frac{3\Delta F}{2}\right), \left(\pm\frac{5\Delta F}{2}\right)$$

etc. Hence, in the subsequent spectrum translation to about zero frequency, the lower sideband difference frequency terms become the superimposed audio frequency signals of differing phase $$\left(\pm\frac{\Delta F}{2}\right), \left(\pm\frac{3\Delta F}{2}\right), \left(\pm\frac{5\Delta F}{2}\right)$$

representing M factors of 1, 3, 5 respectively. The audio frequencies designated negative represent the lower main tone and intermodulation product components located in the incoming RF spectrum at frequencies less than the distribution's mid-frequency value of $f_c$.

It is evident that for such two channel operations with dual quadratic modulation occuring in the channel paths, the necessary phase cancellation between the undesired frequency components that exist at the output signal path can be derived by the insertion of various phase shift arrangements. All that is necessary is that in the course of the signal processing the 180° phase shift be inserted. Since each of the first pair modulators together need only produce therebetween a 90° phase shift, one channel could insert 30° while the other 60° in the opposite sense. In the illustrated and preferred embodiment two 45° shifts are employed in view of the simplicity, similarity of components and equal distribution in the circuitry. This has the further advantage of economy and practicality since single stage 90° phase networks are difficult to realize in practice and other combinations thereof are cumbersome. Accordingly RF phase shift network 157 supplies a positive or leading 45° phase change and network 158 a negative or lagging 45° phase change. These phase networks are set to provide the proper phase change for the condition where $n=1$ and in each a variable element (inductor 157, capacitor 158) is mechanically ganged to the multiplied frequency selective generation previously described so as to be switched to new pre-set RC, RL values for the "$n$" factor selected and coact therewith. This arrangement allows for precise and accurate quadrature at all the operating ($nf_c$) frequencies since the phase shifts can be restricted to about the selected frequency locations.

The outputs of the modulators 155, 156 are applied at one time to their respective variable high pass filters 159 and 160 and to one terminal 161$a$, $b$ of double wafer double throw mode switch 163. These terminals are on different wafer sections 162$a$ and 162$b$. The other terminals 163$a$, $b$ receive the outputs of high pass filters 159, 160 respectively. This switch 163 in effect serves to by-pass, in bandpass mode 2, the high pass filters, which have cut-off frequencies that are identical and being switch coupled are like selective. Similarly the variable low pass filters 164, 165 are so ganged with the like cut-off frequencies selectable. When the high-pass filters are not bypassed they are in series cascade with their respective low pass filters thereby establishing an identical selective bandpass region of variable frequency between the two modulators of each channel. In some design applications, these filters can be supplanted by audio frequency tunable, highly selective ampliflers. These amplifiers must have constant gain with frequency for over the frequency range of tuning and may be of the type previously described in the audio frequency multiplication stage 106. The low-pass filters 164, 165 are identical with each other in construction, as are the highpass filters 159 and 160. They are active filter configurations having maximal flat frequency response over their pass region and sharply attenuating all frequencies below the cut-off frequency for the high-pass circuits and above the cut-off frequency for the low-pass units. Thus the region between the two cut-off frequencies constitutes a sharp, flat-topped selective bandpass region when the switch 163 is in band stop or mode 1 at terminals 163$a$, $b$ and thereby positioned to place in circuit both filters. Mode 1 is so designated band stop for the herein described filtering action as it functions to readily reject the other audio frequency components that are equally spaced and located about the selected audio term of interest. The combined filter arrangement of mode 1 passes only the selected third ($M=3$) or fifth ($M=5$) factor term of $$\left(\frac{M\Delta F}{2}\right)$$

in the modulator outputs. This is accomplished through the appropriate switch selection of filters 159, 160, 164 and 165 cut-off frequencies to be approximately at, and thereby pass without attenuation, the modulator audio frequency output signals corresponding to the specific M factor term under measurement. For the fundamental tone measurement, however, the switch 163 is in the other position, mode 2, and the low pass filters 159, 160 are preset selective to pass only, the audio signal $$\left(\frac{M\Delta F}{2}\right)$$

in the modulator outputs and readily reject all other higher audio frequencies. The signal $$\left(\frac{M\Delta F}{2}\right)$$

is the lowest frequency signal at the modulator outputs and represents the down translation of the main two tone frequencies ($nf_1$) and ($nf_2$) to about the zero frequency position.

A typical example of a suitable low-pass filter configuration is illustrated by the block of filter 164 wherein only two stages are shown but additional like stages may be added thereto. An active RC filter circuit is employed whose frequency cut-off may be varied by interchanging of the resistors and capacitors through proper gang switching. A positive feed amplifier circuit follows the RC network and between the two there exists a negative feedback loop. Clearly with such additional series stages one can provide an attenuation rate exceeding 72 db/octave. Such separate filters are presently available such as the Redcor 440 filter manufactured by the Redcor Corp. of California which functions as a precise switch selectable low pass filter having a frequency and phase response identical to that of a 4th order Butterworth. Similar active configurations using a CR network circuit perform suitably as high pass filters. As described the switch 163 permits two operating or measurement conditions which are designated as modes 1 and 2. Mode 2 by-passes the high pass filters but it should be observed that similar measurement results are obtainable using mode 1 only where the cut-off frequencies of the high pass filters are set for unattenuated passage of the lowest value of the audio term $$\frac{\Delta F}{2}$$

This division into two modes is preferred as it allows for coverage of measurement situations necessitating the most severe selectivity for the lowest audio term within practical limitations.

The audio frequency outputs of the low pass filters 164 and 165 are in quadrature and respectively become the modulating signal inputs to double balanced modulators 166 and 167. The carrier inputs for these modulators are obtained from the test source generated common second audio local oscillator signal $$\left(\frac{M\Delta F}{2}\right)$$

after undergoing quadrature phase shifting due to audio phase shift stages 168 and 169. In considering operation in mode 2, then the down frequency translated main tone frequencies $f_1$ and $f_2$ only are passed through low pass filters 164 and 165 as difference frequency products of audio frequency value $$\frac{\Delta F}{2}$$

cps. In accordance with the invention's audio frequency tuning feature, audio frequency multiplier 106 of FIG. 2 supplying the common audio local oscillator signal for the pair of double balanced modulators, is selectively tuned to generate this signal of identical frequency value as the input modulating signals to these modulators. Hence, M is set equal to 1, that is, the fundamental frequency is selected and the common audio local oscillator generated frequency is $$\frac{\Delta F}{2}$$

Likewise hereafter, when mode I is employed and band stop type operation activiated, then M is set for the modulation with the odd order terms selectively passed by high pass-low pass filter combination within the channels. Therefore, with the passage of the 3rd IM term $M=3$ and the multiplier selected oscillator frequency generated becomes $$\frac{3\Delta F}{2}$$

and with the within channel selection of the 5th IM terms the multiplier 106 is tuned and set to $M=5$ and generates $$\frac{5\Delta F}{2}$$

cps., etc.

Of note is the fact that the difference in frequency therebetween is ΔF cps. or twice the fundamental audio frequency $$\frac{\Delta F}{2}$$

and that the third IM audio term lies one and one-half octaves above cut-off $$\frac{\Delta F}{2}$$

of the mode 2 setting of the low pass filters. Similarly with respect to the Mode 1 setting of the high pass filters, it can be shown that with respect to a cut-off at $$\frac{3\Delta F}{2}$$

the $$\frac{\Delta F}{2}$$

term is one and two-thirds octave below. This process can also be used to determine the octave spacing under both modes and cut-off conditions for the high pass-low pass combination for rejection and selection of $$\frac{5\Delta F}{2}$$

It is to be recognized that for quasi-linear transfer functions of the 3rd and 5th orders, the 7th and higher IM terms are usually insignificant. In general, the 5th IM term is of lesser amplitude than the 3rd term. Assuming, however, an extreme case wherein the 3rd and 5th terms are of equal amplitude, then in selecting the 3rd term, the 5th term is attenuated by 2/3 octave attenuation rate namely, for a 72 db per octave rate, a total of 48 db. For selection of the 5th term, the 3rd IM term is attenuated 4/5 of the octave rate or 58 db. For convenience in the previous description it may have been assumed that the active filters were designed for the cut-off frequency to be at the audio frequency to be passed. In practice on the other hand, the cut-off frequency is conventionally referenced to the 3 db point, and accordingly the actual cut-off frequencies are slightly above the signal being passed in the case of the low pass filters and below in the case of the high pass filters. As example, for the low pass filter with passage of signal $$\frac{\Delta F}{2}$$

at 100 cps., the actual cut-off frequency would be 108 cps. and the octave at 216 cps. A similar situation exists with respect to the actual cut-off frequency locations in the high pass case. Likewise in practice, insertion loss due to the similar filters between the modulators can be neglected since the losses are uniform and only relative type amplitude measurements between the main component used as reference and the IM terms are normally required.

In general the audio phase shift network 168 causing a phase lead of 45°, and phase network 169, giving a 45° lag, may be of the active type having a band response extending flat and wide from say 50 to 5500 cps., but where a greater frequency range is encountered, a suitable number of passive phase shifting networks each covering a narrow bandwidth of say 2000 cps. can be employed by selecting them individually through shown mechanical ganged means. These passive networks can be selected knowing the $$\frac{\Delta F}{2}$$

separation indication supplied by the frequency dial of tunable audio multiplier 106 and the range of the $$\frac{M\Delta F}{2}$$

terms. The double balanced modulators 166 and 167 which receive inputs from the audio phase shift networks 168 and 169 respectively, are similar product modulators that provide a resultant output which is proportional to the amplitude product of its two input signals. They further serve to eliminate the input signal from appearing at the output as well as being balanced to suppress the development of the carrier in the output. The two like modulators may, for example, be of the diode ring type or a Hall generator device wherein a high degree of carrier and modulating signal suppression is achieved with little need for any adjustment. With the supplied constant and relatively large amplitude carrier signal inputs to the modulators, the modulator outputs are linearly related to the amplitude of the modulating signal inputs. Although not illustrated isolating cathode follower stages could be inserted before the inputs to the phase shifters for thus insuring separate transmission paths between the channels. It is to be noted, as is common with product modulator operations, the resultant sideband components in the output are separate from one another by twice the input modulating frequency and are spaced about the suppressed carrier frequency by an amount equal to the modulating frequency, thus representing a double sideband spectrum distribution.

The resultant output of modulator 166 comprises the following $$\left[\left(\frac{+\Delta F}{2}\right)-\left(\frac{\Delta F}{2}\right)\right]$$

and $$\left[\left(\frac{+\Delta F}{2}\right)+\left(\frac{\Delta F}{2}\right)\right]$$

for one of the superimposed audio modulating signals while for the other $$\left(\frac{-\Delta F}{2}\right)$$

we have $$\left[\left(\frac{-\Delta F}{2}\right)-\left(\frac{\Delta F}{2}\right)\right]$$

and $$\left(\frac{-\Delta F}{2}\right)+\left(\frac{\Delta F}{2}\right)$$

Effectively these terms reduce to two spectrum locations, where the lower sideband or difference frequency products are at zero frequency or DC while the upper sideband or sum components become $(-\Delta F)$ and $(+\Delta F)$ signals.

Similarly, the resultant output of double balanced modulator 167 constitutes a DC lower sideband components and component signals of $(-\Delta F)$ and $(+\Delta F)$. Now due to the second quadrature relation that has been employed and the selection of first the difference then the sum product in the signal process, the audio output voltages of the double balanced modulators 166 and 167 have experienced a total of 180 degrees phase reversal with respect to each other, such that the undesired component signals of $(-\Delta F)$ are 180 degrees out of phase while the desired terms of $(+\Delta F)$ are in the phase.

Summation of these signals result in the phase cancellation of the undesired $(-\Delta F)$ components and adding together of the two $(+\Delta F)$ component terms from channels I and II. ADC component terms is also obtained, however, it is to be noted that use of capacitive coupling of the modulator outputs to the linear combining network 170 eliminates the DC terms from the summation process. The sideband outputs are added in linear combining network 170. This audio summation circuit may for example be of resistive components or the audio transformer type, various configurations of which are known to the art. This selective modulation process for double balanced modulators 166 and 167 where the modulating audio signal and the carrier audio signal, are of the identical frequency value, is directly insured by the precise frequency governing action derived by having the common audio local oscillator signals generated and supplied by audio frequency multiplier 106 be set equal at all times to one-half the audio frequency separation between the tones, or odd multiples thereof as required. This identical frequency equating property for the output measuring means allows for more stringent cut-off characteristics in the subsequent filtering and allows for the exact establishment of the DC (or zero frequency) lower sideband component in the final modulator outputs. Hence, the RF two tone signal input spectrum to the selective filter unit 150 results in but a single audiotone output. The high pass filter 171, which is likewise an active filter configuration of variable cut-off frequency similar to high pass filters 159 and 160, has its cut-off frequency set to accept and pass the in phase sum frequency term $(M\Delta F)$ from the output of the linear combining network 170, and sharply attenuate any lower frequency values. This high pass filter thus serves to further attenuate the already highly suppressed carrier signal of $$\frac{M\Delta F}{2}$$

existing in the output of the double balanced modulators 166 and 167, and also eliminate the DC component term and all other undesired signals below its cut-off frequency. The output of high pass filter 171 is then applied to low pass filter 172 having a fixed cut-off frequency value greater than twice the maximum frequency value of $$\frac{M\Delta F}{2}$$

carrier frequency that is to be supplied for the system.

As the carrier and modulating signals in the double balanced modulator outputs are already well suppressed, the attenuation rate of the High Pass Filter 171 need only be sufficient to insure the further attenuation at this frequency value to suitably suppress any such signal to beyond the dynamic range of the herein-described apparatus. In a specific design, the switch selection of the cut-off frequencies of filter 171 can be suitably ganged, though not so shown, to be made in correspondence with the selections of the within channel filters and made switch setting. Greater dynamic range is secured by having the attenuation rate set to further attenuate undesired components ΔF away from cut-off value when the 3rd IM term is being measured. The low pass filter 172 serves to produce a bandpass region that insures rejection of undesired components and its signal output constitutes a pure audio frequency signal that represents the translated and selectively filtered RF frequency term of interest; that is $f_1$ (or $f_2$) for the band pass mode of operation or either the 3rd or the 5th IM frequency term of the RF response in accordance with the band stop mode selection made. It is to be recognized that in design applications wherein a high degree of carrier and signal suppression is achieved from the double balanced modulators, the capacitive coupling of the modulator output to the low pass filter 172 need only be required to eliminate the lower sideband DC component term and can serve to supplant the high pass filter 171 requirement in such a case.

Where a distortion amplitude measurement of greater accuracy is desired, the Low Pass Filter 172 can be also of variable cut-off frequency and be set to sharply attenuate slightly beyond the cut-off frequency of the High Pass Filter 171 thus insuring the suppression of any 3rd harmonic of the second local oscillator frequency that may develop at either modulator output.

The output of low pass filter 172 is applied to rectifier and amplifier stage 173 for subsequent signal rectification and amplitude measurement of its output by volt meter indicator 174. The filtered signal after amplification to a suitable level is rectified by the full wave rectifier bridge of 173. The resultant rectified output is a DC voltage proportional to the filtered input signal's R.M.S. value and is accordingly so indicated by meter 174. A DC output for use with external recording devices to obtain graphical plotting can readily be obtained from the meter circuit. Upon subsequent selection and measurement of the main RF tone frequency term as ΔF and thereafter the 3rd and the 5th RF intermodulation terms as (3ΔF) and (5ΔF) respectively, and in like manner other IM terms of interest as described in detail in the above paragraphs, the successive meter 174 readings thereby obtained become the comparative proportional indications of the amplitude relationships of the selected signals. The described apparatus thereby provides the measurement of the amount of intermodulation distortion developed due to the non-linearity of the device under test 108. If desired, of course, direct indications of the percentage intermodulation distortion can be made by following suitable calibration procedure as known in the art.

Figure 4B:
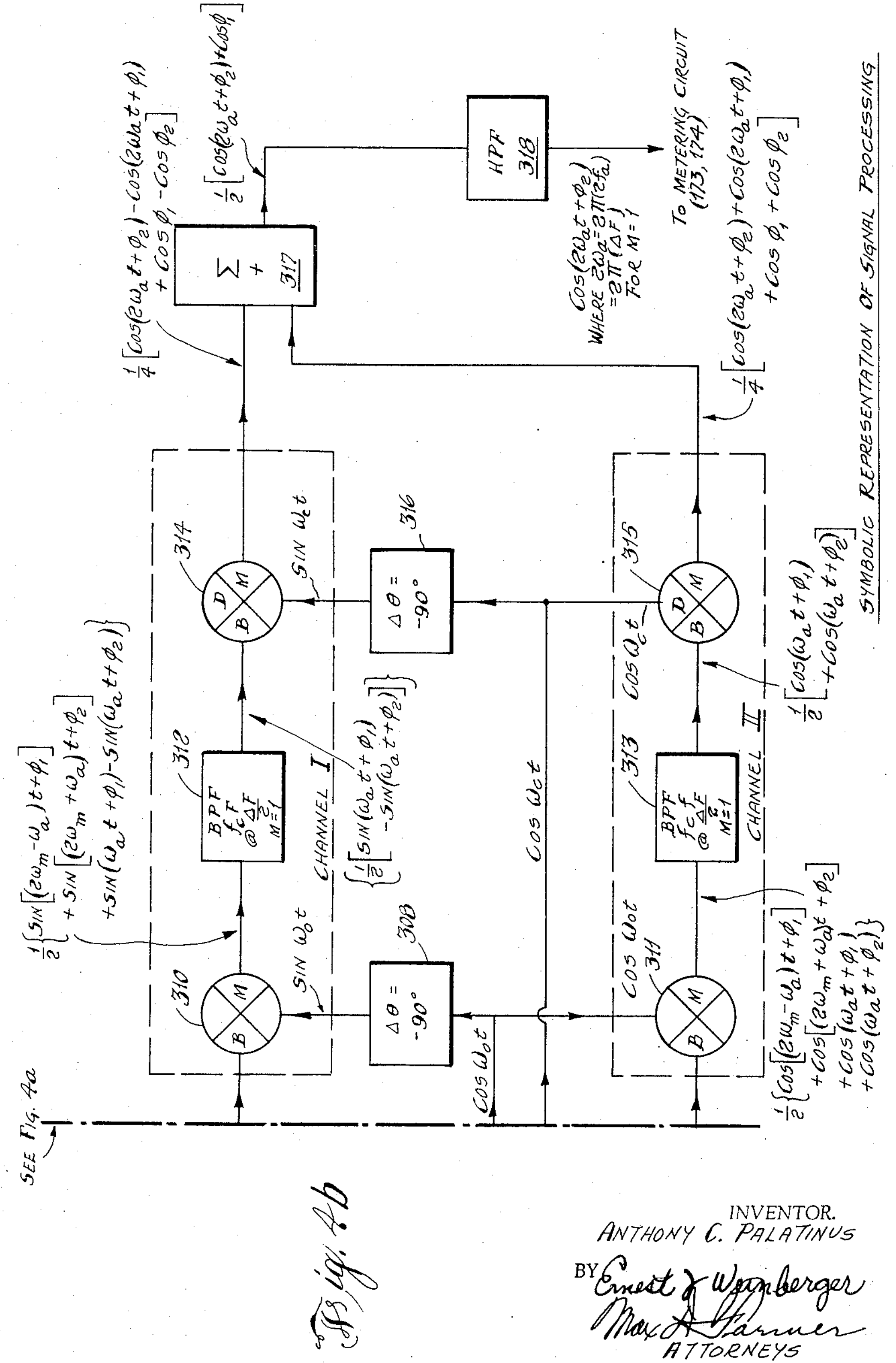

Refer now to FIG. 4, which represents the symbolic representation of the signal processing that basically occurs and from which the principles of operation can be best illustrated and explained, in an analytic manner.

Crystal tone oscillator A generates signal frequency $f_1$, and Crystal tone oscillator B generates signal frequency $f_2$, where $f_2$ equals $f_1$ plus an audio frequency value of ΔF cps. Tones $f_1$ and $f_2$ are added together at linear summer 300 to give the two tone A and B output with the sketched spectrum shown at 301. Tone A is frequency divided by 2 by divider 302 for $$\frac{f_1}{2}$$

and tone B frequency is halved by 303 to give $$\frac{f_2}{2}$$

The frequency divided tone signals mix in a balanced modulator 304 to give sum and difference frequency term outputs. The bandpass filter 305 selects the sum term of $f_c$ (or $f_m$) (or $fo$) which is the mean frequency of the two tones $f_1$ and $f_2$, and the low pass filter 306 passes the audio difference term of $$\frac{\Delta F}{2}$$

Frequency multiplier 307 of variable factor (XM), where $M=1, 3, 5$, etc., multiplies the audio term up to $$\frac{M\Delta F}{2}$$

as selected. This frequency signal represents one half of a multiple of the audio frequency separation or one half of the audio separation as chosen, for the two tones. For convenience let the total phase shift due to phase shifter 308 of 90° lag as shown be lumped and disposed in channel 1 instead of the more practical equally shared 45° phase shift arrangement of opposite polarity used in the previous description and shown in FIG. 3. For theoretical purposes in the explanation of the selective process, consider only the direct two tone input being applied i.e. assume the unit under test 309 to be linear.

Here note is to be made of the fact that a double sideband modulated wave, which is a suppressed carrier AM signal, has its sidebands coherent, that is, of equal but opposite phase. The two tone signal, however, is non-coherent, i.e. the proper phase relation of each tone is independent of the other tone's phase, each signal being separately generated.

The two tone signal of $f_1$ and $f_2$, of unity tone ($Fi=1$) amplitudes can, by frequency representation, be expressed as an equivalent double sideband suppressed carrier signal but with the sideband terms being of differing phase relations, i.e. non-coherent. Within this context, the two tone relation becomes:

$$[\text{Cos } (Wm-Wa)t+\phi_1] + \text{Cos } [(Wm+Wa)t+\phi_2]$$

with the first term being tone $A(f_1)$ or $(fm-fa)$ and with the frequency $(fm+fa)$ being the second term or tone $B(f_2)$. Here $Wm=2\ fm$, where $fm$ is the mean frequency value of the two tone or $$\left(\frac{f_1+f_2}{2}\right)$$

and wherein $Wa=2\pi fa$, with $fa$ being equal to one half the audio frequency separation between the tones or $$\left(\frac{\Delta F}{2}\right)$$

where $\Delta F=(f_2-f_1)$. And finally $\phi_1$ and $\phi_2$ are the arbitrary phase angles of tones $f_1$ and $f_2$, wherein $\phi_1$ and $\phi_2$ are independently brought about. Let the first common RF local oscillator signal be Cos $Wot$, where $Wo=(2\pi f_o)$ with $f_o=fm$. This signal, after 90° phase lag shift, is applied to the balanced modulator 310 of channel I as (Cos $Wot$—90°)=Sin $Wot$. The resultant product term output of this modulator becomes $$\tfrac{1}{2}\{\text{Sin } [(Wm-Wa+Wo)t+\phi_1)] -\text{Sin } [(Wm-Wa-Wo)t+\phi_1)]+[\text{Sin } (Wm+Wa+Wo)t+\phi_2]-\text{Sin } [(Wm+Wa-Wo)t+\phi_2]\}$$

and since $Wm=Wo$, this becomes $$\tfrac{1}{2}\{\text{Sin } [(2Wm-Wa)t+\phi_1]+\text{Sin } (Wat+\phi_1) +\text{Sin } [(2Wm+Wa)t+\phi_2]-\text{Sin } (Wat+\phi_2)$$

The components of $(2Wm-Wa)$ and $(2Wm+Wa)$ represent the translation of the two tone signal to about twice its mean frequency value and are the upper sideband terms, and the terms of W$a$ only represent the folded over difference frequency components with respect to zero frequency and are the lower sideband terms. Going now to the modulation process for the balanced modulator 311 of channel II, we have the double sideband output of the product expressed as $$\{\text{Cos } [(Wm-Wa)t+\phi_1]+\text{Cos } [(Wm+Wa)t+\phi_2]\}(\text{Cos } Wot)$$

which for $Wm=Wo$ consists of terms, $$\tfrac{1}{2}\{\text{Cos } [(2Wm-Wa)t+\phi_1]+\text{Cos } [(2Wm+Wa)t+\phi_2]+\text{Cos } (Wat+\phi_1)+\text{Cos } (Wat+\phi_2)\}$$

The first two terms constitute the upper sideband and the remaining two terms being the lower sideband. The sine function components of channel I and the Cos terms in channel II represent the quadrature relationship that exists between the modulator outputs of these two channels. The audio bandpass filters 312 and 313 that follow the balance modulators are high pass filters—in series cascade with low pass filters. The High Pass Filters, for the bandpass or mode 2 operation, have their cut-off frequency set to be slightly lower than $$\frac{\Delta F}{2}$$

or $f_a$, passing this term and frequencies above. The low pass filters following the high pass units in the combination bandpass filters 312 and 313 have their cut-off frequency set slightly greater than $f_a$ or $$\left(\frac{\Delta F}{2}\right)$$

and passes these audio terms but eliminates all other components above this value. It is to be noted that the selected term consists of folded over signals as a consequence of having the local oscillator source, $f_o$, identical in frequency value to the mean frequency value of the two tones, $f_m$. The passed terms are then the following:

Channel I: $\tfrac{1}{2}[\text{Sin } (Wat+\phi_1)-\text{Sin } (Wat+\phi_2)]$
II: $\tfrac{1}{2}[(\text{Cos } (Wat+\phi_1)+\text{Cos } (Wat+\phi_2)]$ The double balanced modulators 314 and 315 in each channel have modulating signals applied to them that contain the folded over audio terms of $f_a$ remaining after the bandpass filter action. The audio local oscillator signal common for the double balanced modulators, has been set to be of a frequency value, $$\frac{\Delta F}{2}$$

with $M=1$, such that the generated signal is identical to the modulating signal frequency. Let the common oscillator source be expressed as C$ot$ W$et$ where again the carrier signal undergoes a 90° lag phase-shift via shifter 316 in its path for channel I but is directly applied to double balance modulator of channel II. The product output of the double balanced modulator 314 of channel I becomes $$\tfrac{1}{2}[\text{Sin } (Wat+\phi_1)-\text{Sin } (Wat+\phi_2)] \text{ Sin } Wct$$

and consists of the terms:

$$\tfrac{1}{4}\{-\text{Cos } [(Wa+Wo)t+\phi_1+\text{Cos } [(Wa-Wct+\phi_1] +\text{Cos } [(Wa+Wc)t+\phi_2-\text{Cos } [(Wa-Wc)t+\phi_2]\}$$

which for $Wa=Wc$ becomes $$\tfrac{1}{4}[-\text{Cos } (2Wat+\phi_1)+\text{Cos } (2Wat+\phi_2+\text{Cos } \phi_1-\text{Cos } \phi_2]$$

For channel II the product output is $$\tfrac{1}{2}[\text{Cos } (Wat+\phi_1)+\text{Cos } (Wat+\phi_2)][\text{Cos } Wct]$$

and trigonometrically becomes $$\tfrac{1}{4}\{\text{Cos } [(Wa+Wc)t+\phi_1]+\text{Cos } [(Wa-Wc)t+\phi_1] +\text{Cos } [(Wat+Wc)t+\phi_2]+\text{Cos } [(Wa-Wc)t+\phi_2]\}$$

and with $Wa=Wc$, then equals $$\tfrac{1}{4}[\text{Cos } (2Wat+\phi_1)+\text{Cos } \phi_1+\text{Cos } (2Wat+\phi_2)+\text{Cos } \phi_2]$$

Accordingly the linear summation of the outputs of the double balanced modulators at summer 317 is:

$$\tfrac{1}{2}[\text{Cos } (2Wat+\phi_2)+\text{Cos } \phi_1]$$

And after passing through high pass filter 318 the output signal without the DC term, is $$\frac{1}{2}[\text{Cos }(2Wat+\phi_2)]$$

It now can be seen that with good double balanced modulator operation, all that is required is capacitive coupling of the summing circuit out-put to the meter means for the elimination of the lower sideband DC component terms of (Cos $\phi_1$). This capability had been mentioned earlier in this description.

It is understood that while the present illustrated embodiment concerns itself with the measurement of intermodulation component terms appearing above the mean frequency value of the two tones, use of a subtractive combining network allows for the measurement of intermodulation terms below the mean frequency. Alternatively channel I can be given a leading phase relation, wherein FIG. 4 channel I has the lagging phase shiftings.

The unique implementation of the quadrature function operation of the active selective filter can, in a further way, be explained in a relatively analogous manner as given in the following description for a more physical understanding of the signal processing of the invention.

By injecting the generated first local oscillator signal at the mean frequency value of the incoming two tone response spectrum, the 1st polymodulation process functions as a frequency inverting demodulator. For the input frequency components lower than the local oscillator frequency, the lower value components are subtracted from the higher local oscillator frequency resulting in a reversing of the frequency trend of the incoming signal, that is, for increasing of signal frequency before translation there becomes a decreasing of frequency after translation. Accordingly, a phase shift caused in the incoming signal will have an opposite sign from a phase shift caused in the translated signal. In other words a lagging of phase input results in a leading of phase output and vise versa. Thus a phase reversal of the sign of the phase occurs. The higher value components of the incoming two tone response spectrum, that is frequency values above the $f_c$ mean, maintain the same direction of frequency trend in the translated output. Here subtracting the local oscillator signal from the higher component values results in a frequency component output that increases in frequency as the incoming signal component above the local oscillator signal increases in frequency value. Accordingly, a phase shift increase caused in the incoming higher components results in a similar direction phase shift increase in the translated output. That is, a leading phase shift input produces a leading output phase shift, and likewise for phase lag shift of input and output.

Since the local oscillator frequency $f_0$ is disposed frequency-wise between the input main tone signal frequencies $f_1$ and $f_2$, the above mentioned phase sign reversal takes place only for one of these tones, the lower tone $f_1$, in the first modulation process. Hence the higher frequency component $f_2$ undergoes the poly-quadrature modulating signal process such that, say for channel II of FIGURE 4, zero phase shift is introduced while for channel I two 90° phase shiftings are experienced.

However, for channel I, with the sum frequency being of opposite phase, the 180 degree phase shift is negated. Then in the summation, the separate sum frequency terms, being in phases and of equal amplitudes, linearly combine and add. For the lower frequency, $f_1$, however, while of zero phase shift for channel II, undergoes the phase sign reversal in the modulation paths whereby the 180 degree phase shift in not negated, and the output components resulting from tone $f_1$, phase cancel in the summation process. Since cosinusoidal functions were arbitrarily assumed, for the signals to the modulator of channel II, the change of sign of the phase is still expressed as a cosine function for channel II such as the cosinusoidal audio term due to tone frequency $f_2$. Therefore, for channel II where the applied signals to the balanced modulators are of like and even function, i.e. cosinusoidal, then their product is an even function. For the applied signal to balanced modulator of channel I, however, the two signals are of opposite function, i.e. one is odd and sinusoidal and the other is cosinusoidal, and so the resulting product of this is an odd function, i.e. sinusoidal. Without the 90° phase shift, both audio outputs from the channels 1st modulator pair would be identical. However, due to the presence of the phase shift network there results a 90° phase retarding of the local oscillator signal, arbitrarily set to be cosinusoidal, to the balanced modulator of channel I, thus making it sinusoidal. The output of channel I balanced modulator then is quadrature with channel II output.

Now a phase lag of 90 degrees in the local oscillator path can also be expressed as a 90° phase lead of the input signal to the balance modulator and omitting the oscillator lag.

As previously described, the higher frequencies above the oscillator frequency have an equal phase shift increase of the translated output as experienced by the input, such that the audio component output due to tone frequency $f_2$ is increased by 90° in channel I. However the lower frequencies below the local oscillator frequencies, due to the frequency inversion property of the heterodyning operation, result in a phase shift of opposite sign in the translated output, i.e. the audio component output due to tone frequency $f_1$ is retarded by 90°. In the case of leading the cosinusoidal input of tone $f_2$ by 90°, a negative valued audio sinusoidal function develops. For the case a 90° phase lag of the cosinusoidal input of tone $f_1$, a positive audio sinusoidal function results. Going now to the 2nd quadrature modulation process of channel I of FIG. 4, where again the insertion of a 90° phase lag network in the local oscillator path can be considered as inserting a 90° phase lead network in the signal path to the modulator without the phase shift network being in the local oscillator path. The subsequent result is that like functions are still being applied to the 2nd modulator of channel I, now each being cosinusoidal rather than sinusoidal, and the product outputs are even cosinusoidal functions. For the selected audio frequency component due to tone frequency $f_2$, the further phase advance of this term by 90° results in a negative cosinusoidal function in the 2nd modulator output. For the selected audio frequency component due to tone frequency $f_1$, the likewise phase advance of this term by 90° results in a positive cosinusoidal function.

While the difference frequency product was of sole concern for the first pair of modulators, it is now the sum frequency product that is selectively passed from the outputs of the second pair of modulators. It is here to be noted that the difference frequency product or lower sideband and the sum frequency product or upper sideband resulting from a modulation process are in phase opposition, wherein if the lower sideband is designated of positive phase value, the upper sideband accordingly is negative.

Consider now in detail the second poly-quadrature operations, wherein the sideband product output selected, after the summation process, being the sum frequency product. The difference frequency products are deliberately set to be DC terms with the sum products being twice the input modulating frequency. Again the phase lag of 90° in the local oscillator signal path of (Cos *Wat*) to the modulator of channel I can be designated as 90° a phase advance of the input signal to the modulator with the local oscillator signal remaining cosinusoidal. Now for a 90° phase advance of the input signal to the 2nd modulator of channel I, the difference frequency product is likewise advanced 90°, but the sum frequency product, being in phase opposition, is subsequently made to undergo a 90° phase lag. Hence for the audio input term due to tone frequency $f_2$, being an input signal expressed as $$-[\mathrm{Sin}\ (Wat+\phi_2)]$$

can be similarly expressed as $$\left[\mathrm{Cos}\left(Wat+\phi_2+\frac{\pi}{2}\right)\right]$$

Since the 90° phase advance for the lower sideband is a 90° phase lag for the upper (sum) sideband, then a 90° lag of this input signal gives $$[\mathrm{Cos}\ (Wa+\phi_2)]$$

as the input signal. The resulting multiplied output of $$[\mathrm{Cos}\ (Wat+\phi_2)][\mathrm{Cos}\ (Wat)]$$

is the same as for channel II and the two outputs are accordingly in phase and add when combined. However, the audio input term of channel I due to tone frequency, $f_1$, is $$\mathrm{Sin}\ (Wat+\phi_1)$$

and can be expressed in the form $$\left[\mathrm{Cos}\left(Wat+\phi_1-\frac{\pi}{2}\right)\right]$$

Here with the 90° phase lag for the sum product the input signal can be expressed as $$\left[\mathrm{Cos}\left(Wat+\phi_1-\frac{\pi}{2}-\frac{\pi}{2}\right)\right]$$

or $$-[\mathrm{Cos}\ (Wat+\phi_1)]$$

Accordingly, the sum product is in phase opposition to that of channel II since the input signal is of opposite sign and the two subsequently phase cancel when combined. Hence, an output response proportional to input tone frequency $f_2$ results from the activated filter arrangement, while the response due to input tone frequency $f_1$ is eliminated.

Common other local oscillator signal frequencies of ($NF_1$) or ($NF_2$) are made selectable from the test signal source to allow for the system self-check by the output measuring section. In the self-check operation, band pass operation is used and common audio local oscillator signal is set to ($N\Delta F$) and the subsequent output signal of the active selective filter unit 150 is then ($2N\Delta F$). The common RF local oscillator signal of ($NF_1$) supplies the amplitude comparison measurement of ($NF_2$). The DC components also developed are eliminated by the capacitive coupling between stages and particularly at the filters. The RF phase-shifters are adjusted to be in quadrature for frequency ($NF_1$), and then for ($NF_2$), when ($NF_1$) is measured. Having covered in the above detailed description the nature, function, and operation of the output measuring section of this invention with a multiplication factor of $N=I$ in order to simplify the block diagram of FIG. 3 and its explanation, it now remains to consider the overall system operation for the general $n$ factor, namely, where $n$ may equal 2, 3, 4, etc.

The multiple "$n$" capability of the test signal generation is detailed in the description paragraphs pertaining to the test signal generator section shown in FIG. 2. Such operation is equally described concerning the variable capability of the output measuring section of FIG. 3, and the conjunctive performance of these two sections to provide the versatile high frequency range coverage in an incremental manner of this method and its associated apparatus is best understood by way of numerical example.

In keeping with typical numerical examples used throughout this description, consider now the overall operation. Let us assume the crystals units operate at 3.500 mc. and 3.501 mc. for the initial tone frequencies. At this point the ΔF spacing is varied and set to give a ($N\Delta F$) separation of 200 cps. for the $n$ factor of 4. Accordingly by variation of the spacing of the initial tone frequencies to become changed by 475 cps. each, such that increased lower tone frequency becomes 3.500475 mcs. and the higher tone is decreased to 3.500525 mcs. for a ΔF spacing of 50 cps. The mean frequency value remains unchanged at 3.500500 mcs. Hence the absolute frequency values of the applied test output tones appear at ±100 cps. about the frequency center location of 14.002 mcs. The first RF local oscillator signal generated is derived from the sum product of $$\left[\frac{3.500525\ \text{mcs.}}{2}+\frac{3.500475\ \text{mcs.}}{2}\right]$$

being multiplied by factor 4 to thus become the center or mean frequency value of 14.002 mcs.

The second audio local oscillator signal, is generated and obtained from the difference product $$[\tfrac{1}{2}(3.500525-3.500475]$$

also multiplied by $n=4$ to be equal to $$\frac{(N\Delta F)}{2}$$

or 100 cps. Here the divider outputs of channels A and B set for operation with the nominal crystal units of 3.500 mcs. and 3.501 mcs. respectively becomes frequency output signals $$\frac{(3.500525)}{2}\ \text{mcs. and}\ \frac{(3.500475)}{2}\ \text{mcs.}$$

and $$\frac{\Delta F}{2}$$

to the test signal generator's balanced modulator for the 50 cps. ΔF separation.

The following band-pass filter tuned to the mean frequency of 3.5005 mcs. passes the sum frequency term for subsequent multiplication by 4. The low pass-filter after the signal generator modulator has its cutoff frequency set at slightly above $$\frac{\Delta F}{2}$$

which passes $$\left(\frac{\Delta F}{2}\right)$$

or 25 cps. The output signal of $$\left(\frac{\Delta F}{2}\right)$$

or 25 cps. is applied to the audio frequency multiplier where the factor of 4 is secured by tuning the selective frequency amplifier to filter the 4th harmonic existing in the even 'N' harmonics of the full wave rectified waveform of the 25 cps. sinusoidal signal. This 4th harmonic term or 100 cps. represent $$\frac{N\Delta F}{2}$$

which is then applied to selectively filter the main tone signal in the output measuring section for $M=I$.

Accordingly, to thereafter secure the proper selective filtering of the 3rd and say the 5th IM terms of the RF response output of the unit under test, for $N=4$ the selective filtering and audio frequency multiplication designated as follows: for the 3rd term positions are M becomes 3×N or 3×4 or the 12th harmonic term which is then 300 cps., and for the 5th, $M=4\times5$ or 20th harmonic of $$\frac{\Delta F}{2}$$

which is the 20×25 or 500 cps.

The RF phase shift networks of the active selective filter units are switched to be set for the $n=4$ factor to provide plus and minus 45° phase change for the mean frequency of ($NF_c$) or 14.002 mcs. in the 1st common RF local oscillator path to each channel. For the second common audio local oscillator generation in both channels the 45° phase shifting maintains itself over the range of audio frequencies being considered. The response output from the unit under test is, after suitable attenuation, applied to the input of the active selective filter unit. In band-pass operation (mode 2), and with the channel low-pass filter pre-set to cut-off at frequencies above $$\left(\frac{N\Delta F}{2}\right)$$

or 100 cps. for $M=I$, the resultant output of the active selective filter unit becomes ($N\Delta F$) or 200 cps. as the final high pass filter cuts off for frequencies below this value. This output is thereby measured and recorded as proportional to the main tone signal amplitude output of the unit under test.

In the band stop operation (mode 1) high-pass filters, having their cut-off frequency set to pass signals 300 cps. and above are inserted in cascade prior to the channel low-pass filters whose cut-off frequencies have been now set to cut-off at frequencies above 300 cps. The 2nd common local oscillator signal has been set to be $$\left(\frac{3N\Delta F}{2}\right)$$

or 300 cps., and the resultant output of the active selective unit is therefore ($3N\Delta F$) or 600 cps. This signal represents the 3rd odd order difference frequency distortion component existing in the unit under test's response output, being of absolute frequency value of

[(2(14.002100 mcs.)−(14.001900 mcs.)]

or 14.002300 mcs. The subsequent amplitude measurement is proportional to the 3rd IM term's amplitude. Hence in a similar manner, the 5th IM term is likewise selectively processed and measured. To accommodate a wide dynamic range relationship between the main tones and their IM products, a suitable calibrated attenuator, not shown, can be inserted and used in the signal path between the low pass filter 172 of the active selective filter 150 and the metering means 173 and 174 of the output section. So far in the detailed description of the invention apparatus of FIGS. 2 and 3, it has been made evident that the overall system itself constitutes a uniquely specialized type of exceedingly selective wave analysis of the designated test signal, namely, the RF two tone wave. In essence, the disclosed output measuring apparatus of FIG. 3 can likewise be basically considered a highly selective and stabilized, interval tunable type voltmeter. Thus, an additional feature and one of the objectives, to be secured from this device, is a novel method of determining harmonic distortions in the high frequency range. Accordingly, the amount of harmonic distortion produced by the unit under test 108, which for harmonic test would be of wide band width in response to a continuous wave (CW) signal of either ($NF_1$) or ($NF_2$) is typically measured by the apparatus in the following described manner.

One tone, say tone A of $nf_1$ value is directly applied to the unit under test as a single tone test input.

This may be effectively accomplished by cutting off the frequency multiplier 124 of the other tone F2. The initial frequency spacing between the tones $f_1$ and $f_2$ has been arbitrarily set to a value suitable for the "$n$" multiplier factor being used, such that a usable value of ($n\Delta F$) signal output is obtained.

The resultant response output due to non-linearity of what is now a wide band RF unit under test consists of the fundamental input frequency and harmonics of it, i.e., $2nf_1$, $3nf_1$, etc. To measure and evaluate the relative amplitudes of these components, the frequency multiplier 137 and buffer amplifier 138 of the test signal generating section and the RF phase shifting networks of the output measuring section are maintained tunable with each other but separated from the other tuning arrangements.

The band-pass operation mode 2 of the selective filter unit 150 is used. For the fundamental measurement, common RF signal is set to ($nf_c$) to translate the RF component ($NF_1$) to be the $$\frac{N\Delta F}{2}$$

audio term. The audio term is low pass filtered and modulated with $$\frac{n\Delta F}{2}$$

being supplied as common audio signal by the test signal source. The selection filter output is then ($n\Delta F$) and represents the fundamental single RF tone $nf_1$ being applied.

For the second harmonic of ($2nf_1$), common RF signal is now set to ($2nf_c$) and thereby to translate the RF harmonic to $$\left(\frac{2n\Delta F}{2}\right)$$

or ($n\Delta F$) audio term. With the low-pass filtering of this term and common audio signal being set to ($n\Delta F$), the selective filter output of ($2n\Delta F$) then represents the second harmonic component of $nf_1$. Similar operation secures 3rd and higher harmonic amplitude measurements. Hence harmonic distortion measurement can be acquired for a limited number of tones available.

One can observe from the accompanying drawings that the specific circuit configurations as represented by the designated functional blocks and their general individual operation as given in the descriptive examples are well known to those experienced in the electronics art. In effect, this invention method requires no specially unique developed circuitry other than quality design of the typical block configurations designated, with good standard practice and construction, to adequately give the combined overall performance capability herein described for the disclosed system when arranged, connected, and made operable in the manner shown. In addition, it is to be observed that use of a generated signal frequency in being equivalent to the virtual carrier frequency value of the two tone test signal when considered as a simulation of a double sideband generation (or as more directly expressed as the mean or center frequency value of the two tone test signal), and a generated signal frequency that is equal to one-half the value of the frequency separation or an odd multiple factor of it, in the polymodulation process herein described serves to achieve the ultimate in overall frequency trackability and selective stability of the entire distortion test and measurement system. These desirable features are in keeping with the stringent requirements of determining intermodulation distortion content in the high frequency region and for over a comparatively wide dynamic range.

At this point, it is to be understood that the method and apparatus as described above, in accordance with FIGS. 1–4, concern a selectable number of discrete stable frequency locations wherein the maximum dynamic range is achieved due to the absence of any heterodyne operation prior to the poly-modulation filtering process of the Output Measuring Section of FIG. 3. In conjunction with FIG. 3, further consideration is given to a novel test signal source that develops a frequency governed, frequency translation section, an embodiment wherein a continuously tunable RF two tone type of test signal is to be employed, as in the test of multi-band amplifier arrangements and wherein the linearity characteristics across the entire bandwidth is to be measured. A featured method and the apparatus of the invention for continuous measurements over a wide range of frequencies is shown by the circuits arrangement of FIG. 5. Having considered and understood FIGS. 2 and 3, referring now to FIG. 5, the response output of the unit under test 108 is here applied to the input of the frequency governed and stabilized frequency conversion section 500. Variable input attenuator 501 functions to apply the proper signal level at 502 to the input of balanced mixer 503. The spectrum content at the input, which is typical as illustrated, is similar to the input spectrum to the Output Measuring Section of FIG. 3, and has been described in detail in the previous paragraphs as being the main two tones and associated odd order difference frequency intermodulation components.

Balanced Mixer 503 has applied to it a local oscillator signal of frequency, say $f_{eo1}=f_c+500$ kcps. The level of the local oscillator signal is much greater than the incoming signal spectrum to the mixer 503 and establishes the mixer's output as linearly proportional to the input signal level. The local oscillator signal is obtained from the output of tuned RF buffer amplifier 505. Tunable RF amplifier 505 is mechanically ganged to tune and continuously track say, at 500 kcps. above the test output tone frequency of say $f_1$ in accordance with the tuning of RF tone A oscillator 601 that is generating $f_1$. The applied signal to the input of tuned amplifier 505 is the output signal of balanced mixer 507. Balanced mixer 507 heterodynes the two input signals applied to it with one input signal being of fixed frequency value of say 500 kcps. which is the IF of this test system.

This stable 500 kcps. signal is being supplied by fixed IF crystal oscillator 509, which is of conventional design and has its frequency stabilized and controlled by 500 kcps. quartz crystal unit 510. The other input signal applied to mixer 507 is of a frequency value equal to the mean frequency, $$f_c=\left(\frac{f_1+f_2}{2}\right)$$

of the two tone RF test signal being applied to the unit under test 108 and is thus accordingly equal to the center frequency of the intermodulation spectrum response output of the unit being tested. This mean frequency value of $f_c$ may be derived and supplied by the test signal source in accordance with the manner as described in the paragraphs relating thereto. Essentially in a similar operation RF tone frequencies $f_1$ and $f_2$ are set to be of equal amplitude and then are applied over separate paths before they are linearly combined.

Variable frequency RF tone A generator 601 which supplies tone frequency $f_1$ and variable frequency RF tone B generator 602 which supplies tone frequency $f_2$ are by way of example a similar pair of highly stable continuously variable signal generators or they may be a like pair of frequency synthesizers. Linear combining stage 603 sums both tone signals with an equal amplitude relationship being adjusted with the use of internal metering means of the generating sources 601 and 602. The combined output is fed to variable attenuator 604 for subsequent application to the input of the unit under test 108 as the two tone RF test signal of audio frequency separation ΔF.

By way of example for continuous mean frequency generation, the tones $f_1$ and $f_2$ are separately applied to the separate inputs of mixer 605, whose output is made tunable to readily pass the sum frequency output of the mixer or $(f_1+f_2)$ through use of tunable RF amplifier 606, which readily attenuates all other mixer 605 output signals. Subsequently, this passed sum frequency output is applied to frequency divider stage 607 which is set to divide this applied frequency input by a factor of two producing an output signal frequency of $$\left(\frac{f_1+f_2}{2}\right)$$

which equals the mean frequency value of the two tone RF signal being generated, i.e., $f_c$. The frequency divider 607, which may be of the regenerative type is made tunable by being mechanically ganged to tune and track at one-half frequency value with the tuning of the tunable RF amplifier 606. In the alternative, it may track at the frequency tuning of tone generator 601. The divider 607's output becomes the local oscillator signal $f_c$ being supplied to balanced mixer 507 of what is herein termed the Frequency Translating Section 500. The tunable amplifier 606 in the mixer 605 output is mechanically ganged to tune to twice the frequency value of tone frequency $f_1$ with the tuning of RF tone oscillator 601. It is to be recalled that, in this typical example tuned RF amplifier 505 is likewise ganged to tune with tone oscillator 601, but at 500 kcps. above $f_1$. Throughout the range of tuning, the 3 db bandwidth of tuned amplifier 606 is maintained so as to substantially encompass a region of ±ΔF maximum about the frequency to which it is tuned, while the 3 db bandwidth of tuned amplifier 505 is maintained for a region of at least $$\pm\frac{\Delta F}{2}$$

maximum about the frequency to which it is tuned. Hence, the heterodyning of signals $f_c$ and 500 kc. in balanced mixer 507 results in an output consisting of signals $$(f_c+500\text{ kcps.}),\ (f_c-500\text{ kcps.}),\ f_c,$$

and 500 kcps. Accordingly, tuned RF amplifier 505, being set to tune 500 kcps. above the frequency value of the tone oscillator 601 and having a bandwidth at its 3 db points of at least $$\pm\frac{\Delta F}{2}$$

maximum about its center frequency value, thereby allows only the sum frequency output of $(f_c+500$ kcps.) from Balanced Mixer 507 to pass, readily attenuating all other signal frequencies. This signal output of frequency $(f_c+500$ kcps.) serves as the local oscillator signal input $f_{eo1}$ to balanced mixer 503. The resultant output of mixer 503 consists of the signals of $(f_c+500$ kcps.), the input signal spectrum centered about $f_c$, the difference frequency product of the local oscillator signal and the input signal spectrum, and the sum frequency product of the local oscillator signal and the input signal spectrum. Balanced mixer 503 output is applied to fixed bandwidth IF amplifier stage 513 which has its center frequency at 500 kcps. and has a flat bandpass region at least greater than five times the maximum frequency separation being used or (5×ΔF max.). Accordingly, the heterodyning operation in balanced mixer 503 results in the exact frequency translation of the input spectrum applied from about a mean frequency value of $f_c$ to about the IF frequency value of 500 kcps. The frequency conversion is as follows. The difference frequency of $$(f_{eo1}-f_1)$$

i.e.

$$[(f_c+500\text{ kcps.})-(f_c\pm\text{main and IM audio component terms})]$$

becomes $$500\text{ kcps.}\pm\frac{\Delta F}{2},\ \pm\frac{3\Delta F}{2},\ \pm\frac{5\Delta F}{2}$$

etc. component terms. All other signals in mixer 503's output are readily attenuated by the sharp skirt selectivity of the IF amplifier stage 513. The down frequency converted spectrum appearing at the IF amplifier 513 output is then applied to variable IF attenuator 154 for the setting of a suitable amplitude level for feeding over separate paths to the inputs of balanced modulators 155 and 156 of the active filter 150. For the signal processing of the modulator outputs reference may be made to FIG. 3 and the description relevant thereto. Having established a frequency governed, frequency conversion section 500 that functions to accurately translate the spectrum response to be analyzed, from about its RF mean frequency value of $f_c$ to about an IF frequency value of 500 kcps., the poly-modulation quadrature relationship of the selective filter 150 of the output measuring section is then set to have the first modulation process occur at 500 kcps. IF frequency value. Accordingly, the output of fixed IF 500 kcps. crystal controlled oscillator 509 is likewise applying its output signal as the common IF local oscillator signal to the fixed IF phase shifting networks of the selective filter 150. Common local oscillator signal of 500 kcps. is applied to a dual cathode follower. One-half 516 of the dual follower supplies the IF local oscillator signal as the input to fixed phase shift network 157 that advances the phase of the 500 kcps. signal by +45° and applies it as the local oscillator signal to balanced modulator 155.

The other half 517 of the dual cathode follower supplies the IF local oscillator signal output fixed phase shift network 158 which retards the phase of the 500 kcps. signal by 45° and applies its output as the local oscillator signal to balanced modulator 156. The exact establishment of the quadrature phase relationship between the local oscillator signals is now readily attained for a fixed crystal stabilized IF signal and its frequency location is thereafter always centered between the two tone response signal being applied to the inputs of the balanced modulators. The local oscillator signal level to the balanced modulators 155 and 156 is properly established and maintained at the fixed frequency, and this likewise holds for the IF input signal to balanced mixer 507. Use is made of the RF tone meter, not shown, of the two tone RF test signal source to subsequently establish the local oscillator signal levels to balanced mixers 503 and 507 through the gain variation of the tuned RF amplifiers within their paths. The other operating signal to be supplied to the Output Measuring Section for the active selective filter 150 is now derived from the selection of the difference (ΔF) frequency product of the mixing of tone frequencies $f_1$ and $f_2$. The low pass filter 608, in the output of the mixer stage 605 to which tones $f_1$ and $f_2$ are inputs, is set to have a cut-off frequency greater than ΔF maximum that is to be supplied by the two tone test signal source. The low pass filter 608's signal output of ΔF is then applied to audio frequency divider 609 for division by a factor of two to thereby supply a signal frequency of $$\frac{\Delta F}{2}$$

to the variable audio frequency multiplier 106, which is similar to odd harmonic frequency multiplier of FIG. 2 for the subsequent selective generation and supplying of the second audio local oscillator signal $$f_{oo2}=\frac{M\Delta F}{2}$$

for M=1, 3, 5, in accordance with the descriptive paragraphs concerning the test signal source section.

To further insure the frequency stability characteristics of the illustrated two-tone signal source of FIG. 5 and thus enhance the overall performance of this invention's apparatus particularly at very high frequencies, automatic phase control loop means, inserted between the ΔF cps. output of low pass filter 608 and the controlled variable reactance element or reactance tube control 613 which is associated with the frequency generation of RF tone generator 601 is an advantageous feature of this apparatus establishing the frequency control of the ΔF cps. audio frequency separation of the two tone RF test signal.

In a similar manner for the circuit arrangement of FIG. 2, the phase control loop may be established between the $$\left(\frac{\Delta F}{2}\right)$$

output of low pass filter 105 and the voltage sensitive variable capacitance diode of either stable RF tone oscillator 117 or 118. Considering as one embodiment, the arrangement illustrated in FIG. 5, the output of ΔF cps. from lowpass filter 608 is then further applied to the input of phase discriminator 610.

Reference audio oscillator 611, which is highly stable and tunable, is set to generate the reference signal of ΔF cps. to the other input of discriminator 610. The output of the phase discriminator is a DC error signal that is proportional to the difference in phase between the two signals being applied to the discriminator inputs. The DC error signal is applied through low-pass filter 612 to the voltage sensitive variable reactance 613 of RF tone generator 601 and serves as the DC correction voltage bringing about the subsequent phase lock between the ΔF cps. output of low pass filter 608 and the ΔF cps. reference signal output of audio oscillator 611. Accordingly the voltage sensitive variable reactance 613 responds to the correction voltage and coacts with the frequency determining circuitry of RF tone oscillator 601 in the conventional manner to thereby change its frequency of operation until the two signals being compared by the phase discriminator 610 are locked in phase.

Low-pass filter 612 functions to stabilize the gain characteristics of the feedback control loop. Thus, the automatic phase control (APC) loop acts to precisely maintain the selected audio frequency separation between the two RF tones generated, and exhibits its greatest advantage by allowing the relaxation of frequency stability requirements of the RF tone generators. In practice, with the mean frequency value essentially tracking itself, then this novel automatic phase control operation implemented as shown in FIG. 5 provides for use of less complex RF tone generators than frequency synthesizers with yet equally insured maintenance of the separation interval of ΔF cps.

It is to be noted that a frequency reversal is experienced in the frequency translation process of FIG. 5, where the local oscillator frequency $f_{eo1}$ input to Mixer 503 is higher than the incoming spectrum frequencies about $f_c$ at 502 and the resulting difference frequency between the two is selected from the mixer output. Since the two tone spectrum response distribution is normally symmetrical with respect to the mean frequency $f_c$ location of the spectrum, the frequency reversal is inconsequential with respect to the overall operation. In such situations, wherein a specific tone or IM component term is of primary interest, a polarity convention can be readily established for the signal processing operation to accordingly properly designate the particular IM term that is being measured.

In the above-described embodiment, the stable frequency governed, frequency translator 500 with its IF at 500 kcps. serves to cover the high frequency range of 2–30 mcs. By way of example, an IF at 10 mcs. would well be applicable for the VHF region of 30–300 mcs., while 30 mcs. IF is satisfactory for the UHF range above 300 mcs.

The many advantages and unique features of this invention become more readily evident when one considers and understands the integration of the three sections described in detail in the above paragraphs. It is to be noted that these embodiments fulfill their greatest purpose in the signal processing of the high frequency two-tone test signal response of quasilinear electrical units. Further, wherein the audio frequency difference interval between the test tones is rather small and a wide dynamic range is to be experienced between the test tones and the level of the IM components that develop, the innovation of accomplishing all selective tuning in the low audio frequency region while leaving undisturbed the self-tracking frequency translation insures a highly repeatable degree of measurement accuracy. In addition, securance of the difference frequency phase lock further enhances the precision capabilities of the method and apparatus for the measurement of intermodulation distortion as has been disclosed by the above descriptive specification and the accompanying drawings of this application.

While the preferred embodiments of this invention, as illustrated by the associated drawings, and set forth in the specification by way of example, has been presented, it is clear that further modifications will become apparent to others skilled in the art. It is thereby not intended to have this invention limited by the particular arrangements shown and described. It is therefore desired that such variations occurring be considered as falling within the true spirit and scope of this invention as defined in the appended claims.

I claim:

1. A device for measuring the intermodulation distortion of a unit under test which comprises:

(a) means for generating a two tone RF signal of frequencies $f_1$ and $f_2$ which are separated from one another by an audio frequency, and passing said two tone signal through said unit, (b) a pair of channels I and II each having connected in series therein, (1) a balanced modulator having a pair of inputs and an output, (2) an adjustable high pass filter, (3) an adjustable low pass filter, (4) a double balanced modulator, having a pair of inputs and an output, one of said double balanced modulator inputs connected to said low pass filter, (c) connecting means for applying the output of said unit to one input each of said balanced modulators, (d) a pair of 45° phase lead networks, one of said lead networks having its output connected to the other input of said balanced modulator in one of said channels and the output of the other of said lead networks connected to the other input of said double balanced modulator in said one of said channels, (e) a pair of 45° phase lag networks, one of said lag networks having its output connected to the other input of said balanced modulator in the other of said channels and the output of the other of said lag networks connected to the other input of said double balanced modulator in the said other of said channels, (f) means for generating a multiple of the center frequency $f_c$ being disposed frequency-wise between said frequencies $f_1$ and $f_2$, and applying the same multiple to the inputs of said one of said lead and lag networks, (g) means for generating a frequency equal to a multiple of one half $$\left(\frac{\Delta F}{2}\right)$$

the separation between the two tones $f_1$ and $f_2$ and for applying the same to the inputs of said other of said lead and lag networks, (h) linear combining means having its inputs connected to the outputs of said double balanced modulators, (i) measuring means for indicating the amplitude of the audio frequency component of the output of said linear combining means whereby said amplitude is an indication of the RF tone and intermodulation term amplitude being measured and which selection is dependent of the multiples of $f_c$ and $$\frac{\Delta F}{2}$$

2. The device according to claim 1, wherein said means for generating a multiple of said center frequency comprises:

(a) a pair of frequency dividers each having an input and an output wherein the output frequency is one-half the frequency of the input, (b) means for applying one of said two-tone RF signals to one of said inputs of said dividers and the other of said two-tone RF signals to the other of said dividers, (c) a balanced modulator having a pair of inputs and an output, said outputs of said dividers connected to said inputs of said modulator, (d) a bandpass filter tuned and connected to pass only the sum frequency output of said modulator, (e) a variable frequency multiplier connected to multiply the output of said bandpass filter.

3. The device according to claim 2, wherein said means for generating a frequency equal to a multiple of one-half $$\left(\frac{N\Delta F}{2}\right)$$

which comprises:

(a) a pair of frequency dividers each having an input and an output wherein the output frequency is one-half the frequency of the input, (b) means for applying one of said two-tone RF signals to one of said inputs of said dividers, (c) means for applying the other of said RF signals to the input of the other of said dividers, (d) a balanced modulator having a pair of inputs and an output, said outputs of said dividers connected to said inputs of said modulator, (e) a low pass filter tuned and connected to pass only the difference frequency output of said modulator, (f) a variable audio frequency multiplier connected to the output of said low pass filter.

4. A device for measuring the intermodulation distortion characteristics of an active unit under test which comprises:

(a) a test signal source means having three output signals, one of said signals being a two-tone signal consisting of two RF frequency oscillations ($f_1$ and $f_2$) being frequency separated by an audio signal ΔF, a center frequency signal $f_c$ defined as $$\left(\frac{f_1+f_2}{2}\right)$$

and an audio signal being a multiple of half the audio signal $$\left(\frac{M\Delta F}{2}\right)$$

(b) means for applying said two-tone signal to said unit under test, (c) frequency conversion means for translating the output of said unit about an intermediate frequency including a source for generating said intermediate frequency, (d) a pair of channels I and II each having connected in series therein, (1) a balanced modulator having a pair of inputs and an output, (2) an adjustable high pass filter, (3) an adjustable low pass filter, (4) a double balanced modulator having a pair of inputs and an output, one of said double balanced modulator inputs connected to said low pass filter, (e) connecting means for applying the output of said conversion means to one input each of said balanced modulators, (f) a pair of fixed IF 45° lead phase shifters, one of said lead phase shifters having its output connected to the other input of said balanced modulators in one of said channels and the output of the other of said lead shifters connected to the other input of said double balanced modulator in said other of said channels, (g) a pair of fixed IF 45° lag phase shifters, one of said lag shifters having its output connected to the other input of said balanced modulator in the other of said channels and the output of the other of said lag shifters connected to the other input of said double balanced modulator in the said other of said channels, (h) means applying said intermediate frequency to the input of each of said one of said lead and lag shifters, (i) second means for applying said multiple of half the audio signal to the input of each of said other of said lead and lag shifters, (j) linear combining means having its inputs connected to the outputs of said double balanced modulators, (k) measuring means for indicating the amplitude of the audio frequency component of the output of said linear combining means, whereby said amplitude is an indication of the selected RF tone and intermodulation term amplitude being measured.

5. The device according to claim 4, wherein said frequency conversion means includes:

(a) a series path having connected therein an RF attenuator having its input connected to the output of said unit, (b) a first balanced mixer having a pair of inputs and an output, (c) an intermediate frequency amplifier, (d) a second series path having included therein:

(1) said source for generating said IF frequency, (2) a second balanced mixer having its output connected to said IF amplifier, (3) a tuned RF amplifier and the other input of said first mixer, (e) the other input of said second balanced mixer connected to said test signal source to receive said center frequency signal $f_c$.

6. The device according to claim 5, wherein said source for generating said intermediate frequency is a crystal controlled oscillator.

References Cited

UNITED STATES PATENTS

| | | | |
|---|---|---|---|
| 2,422,386 | 6/1947 | Anderson | 324—79 |
| 2,492,218 | 12/1949 | Guanella | 331—43 |
| 2,781,450 | 2/1957 | Ianouchewsky | 331—43 XR |
| 2,892,944 | 6/1959 | Wu | 331—37 |
| 3,060,380 | 10/1962 | Howells et al. | 324—77 |
| 3,222,459 | 12/1965 | Drapkin | 331—56 XR |
| 3,225,316 | 12/1965 | Saraga | 324—77 |

RUDOLPH V. ROLINEC, *Primary Examiner.*

EDWARD E. KUBASIEWICZ, *Assistant Examiner.*